(12) United States Patent
Kim et al.

(10) Patent No.: US 11,722,914 B2
(45) Date of Patent: Aug. 8, 2023

(54) METHOD AND APPARATUS FOR GENERATING AND TRANSMITTING POWER HEADROOM REPORT IN MOBILE COMMUNICATION SYSTEM

(71) Applicant: Samsung Electronics Co., Ltd., Suwon-si (KR)

(72) Inventors: Soenghun Kim, Suwon-si (KR); Sangsoo Jeong, Suwon-si (KR); Sunghwan Won, Seoul (KR); Kyeongin Jeong, Yongin-si (KR); Jaehyuk Jang, Suwon-si (KR); Gert-Jan Van Lieshout, Middlesex (GB); Sangbum Kim, Suwon-si (KR); Songyean Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 83 days.

(21) Appl. No.: 17/200,638

(22) Filed: Mar. 12, 2021

(65) Prior Publication Data

US 2021/0204153 A1    Jul. 1, 2021

Related U.S. Application Data

(63) Continuation of application No. 16/041,600, filed on Jul. 20, 2018, now Pat. No. 10,952,085, which is a
(Continued)

(51) Int. Cl.
*H04W 24/08* (2009.01)
*H04W 52/36* (2009.01)
(Continued)

(52) U.S. Cl.
CPC ......... *H04W 24/08* (2013.01); *H04W 52/365* (2013.01); *H04W 24/10* (2013.01); *H04W 84/042* (2013.01)

(58) Field of Classification Search
CPC .... H04L 5/0007; H04W 24/08; H04W 24/10; H04W 52/242; H04W 52/34;
(Continued)

(56) References Cited

U.S. PATENT DOCUMENTS

| 9,426,752 B2 | 8/2016 | Zhang et al. |
| 9,603,098 B2 | 3/2017 | Ryoo et al. |

(Continued)

FOREIGN PATENT DOCUMENTS

| EP | 2663139 A1 * | 11/2013 | ............ H04W 52/04 |
| EP | 2849368 A2 * | 3/2015 | ............ H04L 5/0032 |

(Continued)

OTHER PUBLICATIONS

International Search Report dated Oct. 30, 2015 in connection with International Application No. PCT/KR2015/007452, 3 pages.
(Continued)

*Primary Examiner* — Eric Nowlin

(57) ABSTRACT

Provided are a communication method and system enabling convergence of 5G communication and IoT technology to achieve higher data rates for beyond 4G communication systems.
In addition, provided is a method for transmitting a power headroom report (PHR) by a user equipment (UE) in a mobile communication system. The method includes: receiving a first PHR configuration information for a first base station (first ENB); receiving a second PHR configuration information for a second ENB; generating, when the UE has dual connectivity to the first ENB and the second ENB, a dual connectivity PHR containing PHR information for the first ENB and second ENB based on a dual connectivity PHR format; and sending the dual connectivity PHR. There is also provided a user equipment supporting the
(Continued)

above method. There is further provided a base station and operation method therefor that enable the user equipment to have dual connectivity.

16 Claims, 11 Drawing Sheets

Related U.S. Application Data continuation of application No. 14/806,875, filed on Jul. 23, 2015, now Pat. No. 10,051,500.

(60) Provisional application No. 62/028,202, filed on Jul. 23, 2014.

(51) Int. Cl.
*H04W 24/10* (2009.01)
*H04W 84/04* (2009.01)

(58) Field of Classification Search
CPC ............. H04W 52/365; H04W 52/367; H04W 72/0413; H04W 84/042; H04W 88/06
See application file for complete search history.

(56) References Cited

U.S. PATENT DOCUMENTS

| | | | |
|---|---|---|---|
| 9,655,066 B2 | 5/2017 | Lee et al. | |
| 9,706,593 B2 | 7/2017 | Park et al. | |
| 9,794,839 B2 | 10/2017 | Lin et al. | |
| 9,826,488 B2 | 11/2017 | Park et al. | |
| 9,826,489 B2 | 11/2017 | Park et al. | |
| 10,051,500 B2 * | 8/2018 | Kim | H04W 24/08 |
| 10,952,085 B2 * | 3/2021 | Kim | H04W 52/365 |
| 2012/0218904 A1 | 8/2012 | Narasimha et al. | |
| 2012/0314640 A1 | 12/2012 | Kim et al. | |
| 2013/0028231 A1 | 1/2013 | Zhang et al. | |
| 2013/0182658 A1 | 7/2013 | Xu et al. | |
| 2014/0056278 A1 | 2/2014 | Marinier et al. | |
| 2014/0129672 A1 | 5/2014 | Singh | |
| 2015/0181479 A1 | 6/2015 | Lin et al. | |
| 2015/0181593 A1 * | 6/2015 | Kim | H04W 76/15 370/329 |
| 2015/0195796 A1 | 7/2015 | Sivanesan et al. | |
| 2015/0215877 A1 | 7/2015 | Ahn et al. | |
| 2015/0264655 A1 | 9/2015 | Lee et al. | |
| 2015/0271811 A1 | 9/2015 | Kim et al. | |
| 2015/0304966 A1 | 10/2015 | Park et al. | |
| 2016/0029235 A1 | 1/2016 | Kim et al. | |
| 2016/0029361 A1 | 1/2016 | Lu et al. | |
| 2016/0066284 A1 | 3/2016 | Kwon et al. | |
| 2016/0088624 A1 | 3/2016 | Lee et al. | |
| 2016/0128046 A1 | 5/2016 | Sebire et al. | |
| 2016/0150485 A1 | 5/2016 | Yi | |
| 2016/0205681 A1 | 7/2016 | Kim et al. | |
| 2016/0337989 A1 | 11/2016 | Chen | |
| 2017/0013498 A1 | 1/2017 | Yi et al. | |
| 2017/0118658 A1 | 4/2017 | Hwang et al. | |
| 2017/0223642 A1 | 8/2017 | Lee et al. | |
| 2018/0035470 A1 | 2/2018 | Chen et al. | |

FOREIGN PATENT DOCUMENTS

| | | | | |
|---|---|---|---|---|
| EP | 2663139 B1 * | 1/2019 | ............ | H04W 52/04 |
| EP | 2849368 B1 * | 7/2020 | ............ | H04L 5/0032 |
| EP | 3474611 B1 * | 8/2020 | .......... | H04W 52/365 |
| KR | 10-2013-0069728 A | 6/2013 | | |
| KR | 10-2013-0076893 A | 7/2013 | | |
| WO | 2011/105856 A2 | 9/2011 | | |
| WO | 2013/025562 A1 | 2/2013 | | |
| WO | 2013/113390 A1 | 8/2013 | | |
| WO | WO-2013169048 A2 * | 11/2013 | .......... | H04L 5/0032 |
| WO | 2014/014283 A1 | 1/2014 | | |
| WO | 2014/109687 A1 | 7/2014 | | |
| WO | 2015/137661 A1 | 9/2015 | | |

OTHER PUBLICATIONS

Samsung, "Power Headroom Report for Dual Connectivity", 3GPP TSG RAN WG2 #85b, Mar. 31-Apr. 4, 2014, R2-141478, 8 pages.
Extended European Search Report dated Dec. 21, 2017 in connection with European Patent Application No. 15824624.9, 11 pages.
Nsn et al., "PHR for dual connectivity", 3GPP TSG-RAN WG2 Meeting #86, R2-142089, May 2014, 7 pages.
LG Electronics Inc. "PHR operation for dual connectivity", 3GPP TSG-RAN2 Meeting #85, Feb. 10-14, 2014, 3 pages, R2-140742.
Ericsson, "Power headroom report for Dual Connectivity", 3GPP TSG-RAN WG2 #85bis, Mar. 31-Apr. 4, 2014, Tdoc R2-141554, 4 pages.
Intel Corporation, "PHR for Dual Connectivity", 3GPP TSG-RAN2 Meeting #85, Feb. 10-14, 2014, R2-140283, 2 pages.
Communication pursuant to Article 94(3) EPC in connection with European Application No. 19204669.6 dated Jun. 24, 2020, 12 pages.
Nsn, et al., "PHR for dual connectivity," R2-140139 Update of R2-134089, 3GPP TSG-RAN WG2 Meeting #84, Prague, Czech Republic, Feb. 10-14, 2014, 7 pages.

* cited by examiner

FIG. 7
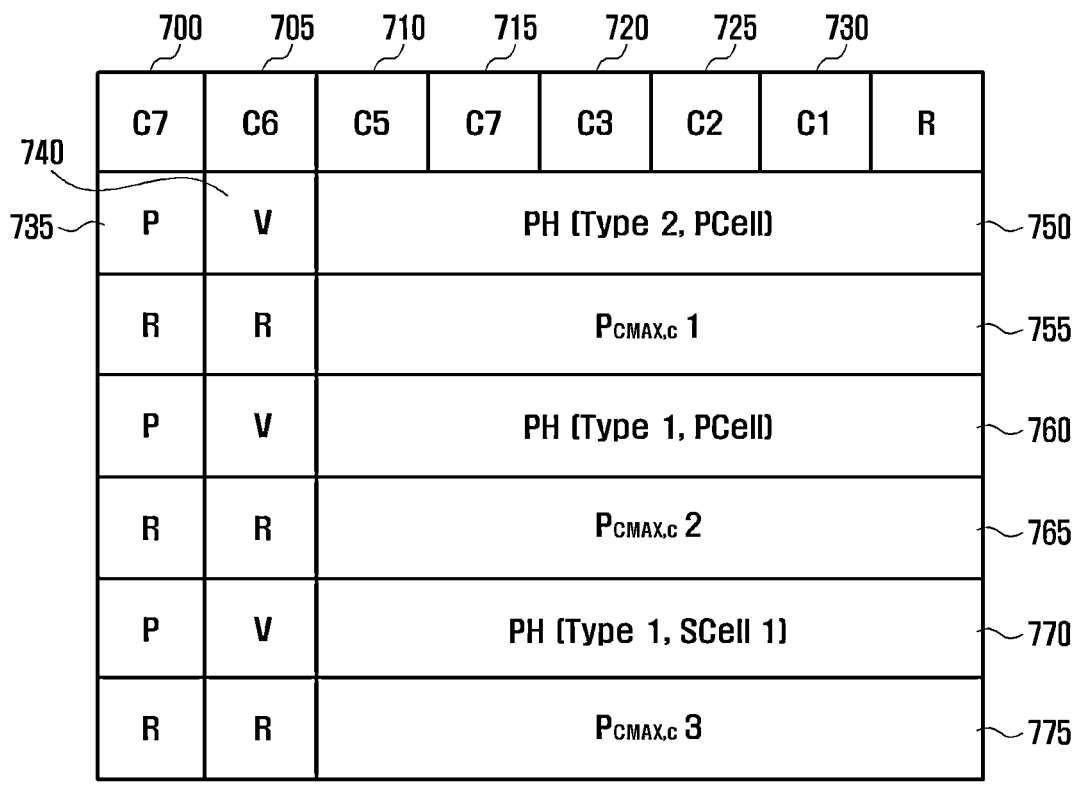
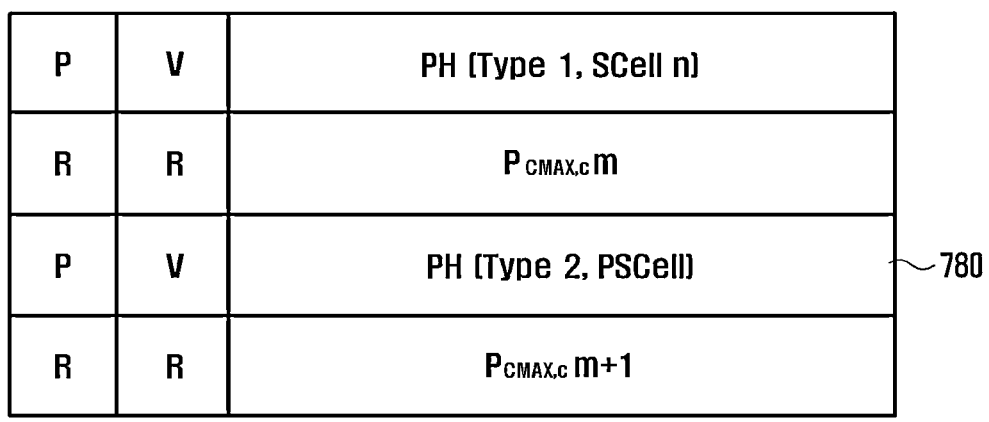

METHOD AND APPARATUS FOR GENERATING AND TRANSMITTING POWER HEADROOM REPORT IN MOBILE COMMUNICATION SYSTEM

CROSS-REFERENCE TO RELATED APPLICATIONS

This application is a continuation of U.S. patent application Ser. No. 16/041,600 filed on Jul. 20, 2018, which is a continuation of U.S. patent application Ser. No. 14/806,875 filed on Jul. 23, 2015, now U.S. Pat. No. 10,051,500 issued on Aug. 14, 2018, which claims the benefit of U.S. Provisional Patent Application No. 62/028,202 filed on Jul. 23, 2014, the disclosures of which are hereby incorporated by reference in their entirety.

BACKGROUND

1. Field

The present disclosure relates to a method and apparatus for generating and transmitting a power headroom report (PHR) in a mobile communication system. More particularly, the present disclosure relates to a method and apparatus for generating and transmitting a PHR in a user equipment supporting dual connectivity.

2. Description of Related Art

In general, mobile communication systems have been developed to provide communication services while guaranteeing user mobility. Thanks to rapid technological advancement, mobile communication systems are capable of providing not only voice communication services but also high-speed data communication services.

Recently, the 3rd Generation Partnership Project (3GPP) has been working to standardize specifications for the Long Term Evolution (LTE) system as a next generation mobile communication system. The LTE system aims to realize high-speed packet based communication supporting a data rate of several hundreds of megabits per seconds (Mbps) exceeding existing data rates, and standardization thereof is near completion.

Active efforts are underway to develop the LTE-Advanced (LTE-A) system by introducing various new communication schemes to the LTE system. Carrier aggregation (CA) is a representative one of newly introduced communication schemes. Unlike an existing user equipment that uses one downlink carrier and one uplink carrier for data transmission and reception, a user equipment supporting carrier aggregation uses multiple downlink carriers and multiple uplink carriers.

In current LTE-A, only intra-ENB carrier aggregation is specified. This reduces potential applicability of carrier aggregation and hampers aggregation of macro and pico cells particularly in a situation where multiple pico-cells and one macro-cell are deployed in an overlapping manner.

To cope with the increasing demand for wireless data traffic after commercialization of 4G communication systems, active efforts are underway to develop enhanced 5G or pre-5G communication systems. As such, 5G or pre-5G communication systems are referred to as beyond 4G communication systems or post LTE systems. To achieve high data rates, use of the extremely high frequency (mmWave) band (e.g., 60 GHz band) is expected in a 5G communication system. To reduce propagation pathloss and to increase propagation distance at the mmWave band, use of various technologies such as beamforming, massive MIMO, full dimensional MIMO (FD-MIMO), array antenna analog beamforming and large scale antenna are under discussion for 5G communication systems. To enhance system networks, various technologies such as advanced small cell, cloud radio access network (cloud RAN), ultra-dense network, device-to-device (D2D) communication, wireless backhaul, moving network, cooperative communication, Coordinated Multi-Points (CoMP) and interference cancellation are under development for 5G communication systems. In addition, for 5G communication systems, hybrid FSK and QAM modulation (FQAM) and sliding window superposition coding (SWSC) are under development for advanced coding modulation (ACM), and filter bank multi carrier (FBMC), non-orthogonal multiple access (NOMA) and sparse code multiple access (SCMA) are under development for advanced access.

Meanwhile, the Internet is evolving from a human centered network where humans create and consume information into the Internet of Things (IoT) where distributed elements or things process and exchange information. Big data processing through cloud servers and IoT technology are being combined into the Internet of Everything. To realize IoT services, base technologies such as sensing, wired/wireless communication and network infrastructure, service interfacing and security are needed, and technologies interconnecting things such as sensor networks, Machine-to-Machine (M2M) or Machine Type Communication (MTC) are under development. In IoT environments, it is possible to provide intelligent Internet technology services, which collect and analyze data created by interconnected things to add new values to human life. Through convergence and combination with existing information technology, IoT technology is applied to various areas such as smart homes, smart buildings, smart cities, smart or connected cars, smart grids, health-care, smart consumer electronics, and advanced medical instruments.

Accordingly, various attempts are being made to apply 5G communication systems to IoT networks. For example, sensor networks and machine-to-machine or machine type communication are being realized by use of 5G communication technologies including beamforming, MIMO and array antennas. Application of big data processing to cloud RANs is an instance of convergence of 5G communication technology and IoT technology.

SUMMARY

Aspects of the present disclosure are to address at least the above mentioned problems and/or disadvantages. To address the above-discussed deficiencies, it is a primary object to provide a method and apparatus for generating and transmitting a power headroom report (PHR) in a mobile communication system.

Another aspect of the present disclosure is to provide a method and apparatus for generating and transmitting a PHR in a user equipment supporting dual connectivity.

In accordance with an aspect of the present disclosure, a method provides for transmitting a power headroom report (PHR) by a user equipment (UE) in a mobile communication system. The method includes: receiving a first PHR configuration information for a first base station (first ENB); receiving a second PHR configuration information for a second ENB; generating, when the UE has dual connectivity to the first ENB and the second ENB, a dual connectivity PHR containing PHR information for the first ENB and second ENB based on a dual connectivity PHR format; and sending the generated dual connectivity PHR.

In accordance with another aspect of the present disclosure, a method provides for receiving a power headroom report (PHR) by a first base station (first ENB) in a mobile communication system. The method includes: transmitting a first PHR configuration information of the first ENB to a user equipment (UE); transmitting a second PHR configuration information of a second ENB to the UE; and receiving a PHR from the UE, wherein, when the UE has dual connectivity to the first ENB and the second ENB, the PHR is a dual connectivity PHR that contains PHR information for the first ENB and second ENB and is generated based on a dual connectivity PHR format.

In accordance with another aspect of the present disclosure, a user equipment (UE) provides supporting transmission of a power headroom report (PHR) in a mobile communication system. The user equipment includes: a transceiver unit configured to send and receive signals; and a control unit configured to control a process of receiving a first PHR configuration information for a first base station (first ENB), receiving a second PHR configuration information for a second ENB, generating, when the UE has dual connectivity to the first ENB and the second ENB, a dual connectivity PHR containing PHR information for the first ENB and second ENB based on a dual connectivity PHR format, and sending the generated dual connectivity PHR.

In accordance with another aspect of the present disclosure, a first base station (first ENB) provides supporting reception of a power headroom report (PHR) in a mobile communication system. The first base station includes: a transceiver unit configured to send and receive signals; and a control unit configured to control a process of transmitting a first PHR configuration information of the first ENB to a user equipment (UE), transmitting a second PHR configuration information of a second ENB to the UE, and receiving a PHR from the UE, wherein, when the UE has dual connectivity to the first ENB and the second ENB, the PHR is a dual connectivity PHR that contains PHR information for the first ENB and second ENB and is generated based on a dual connectivity PHR format.

Other aspects, advantages, and salient features of the disclosure will become apparent to those skilled in the art from the following detailed description, which, taken in conjunction with the annexed drawings, discloses various embodiments of the present disclosure.

In a feature of the present disclosure, it is possible to provide a method and apparatus for generating and transmitting a power headroom report (PHR) in a mobile communication system. In addition, it is possible to provide a method and apparatus for generating and transmitting a PHR in a user equipment supporting dual connectivity.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 7 illustrates a PHR format according to various embodiments of the present disclosure;

DETAILED DESCRIPTION

Figure 1:
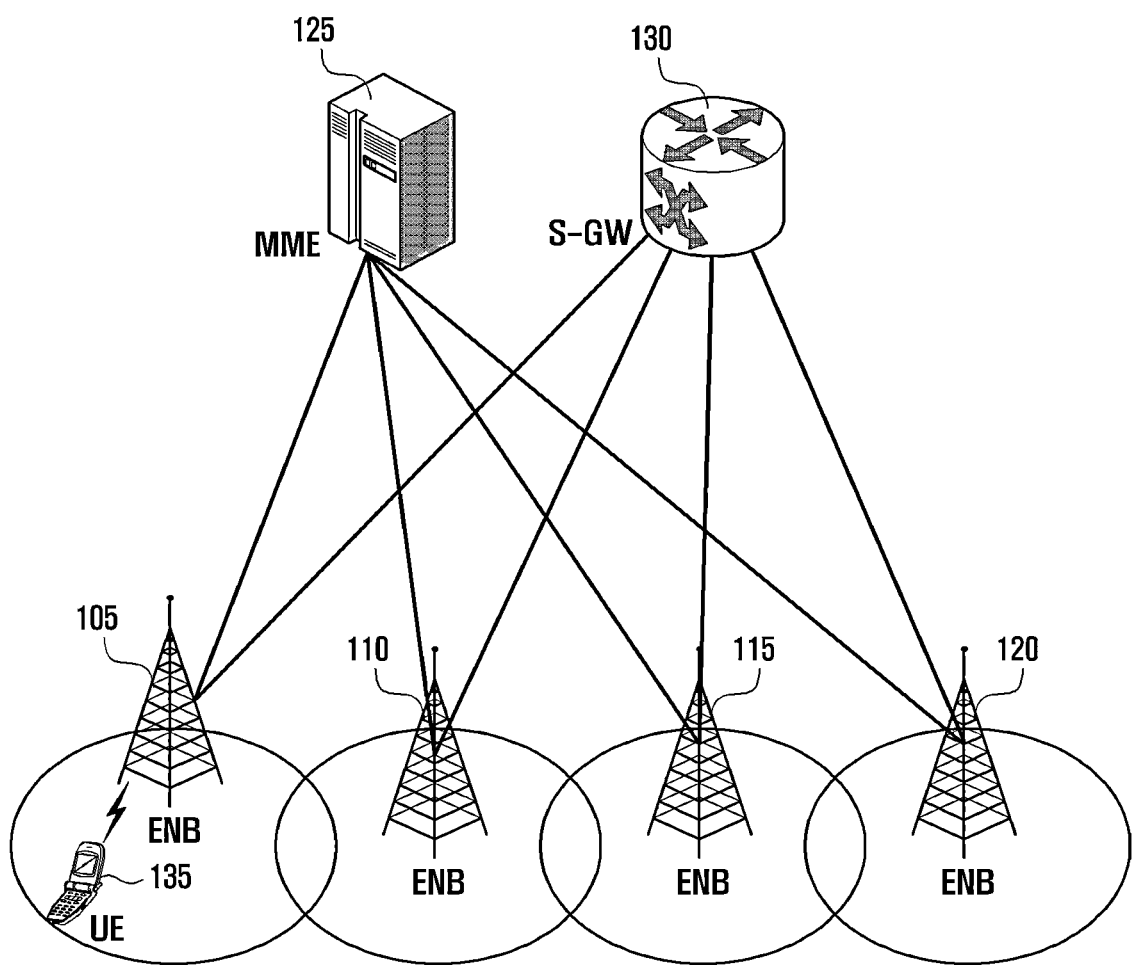
FIG. 1 illustrates an LTE system architecture according to various embodiments of the present disclosure.

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication device. Hereinafter, embodiments of the present disclosure are described in detail with reference to the accompanying drawings. Detailed descriptions of well-known functions and structures incorporated herein may be omitted to avoid obscuring the subject matter of the present disclosure. Particular terms are defined to describe the disclosure in the best manner. Hence, the meaning of specific terms or words used in the specification and the claims should not be limited to the literal or commonly employed sense, but should be construed in accordance with the spirit of the present disclosure.

The following description includes various specific details to assist in comprehensive understanding but these are to be regarded as merely exemplary. Accordingly, those of ordinary skill in the art will recognize that various changes and modifications of the embodiments described herein can be made without departing from the scope and spirit of the present disclosure.

The terms "first," "second," "third" and the like in the description and in the claims are used for distinguishing between similar elements and not necessarily for describing a sequential or chronological order. It is to be understood that the terms so used are interchangeable under appropriate circumstances. The term "and/or" used in the context of "X and/or Y" should be interpreted as "X," or "Y," or "X and Y."

The phraseology and terminology used herein is for the purpose of description and should not be regarded as limiting. It is to be understood that the singular forms "a," "an," and "the" include plural referents unless the context clearly dictates otherwise. It will be further understood that the terms "comprising", "including", "having" and variants thereof specify the presence of stated features, steps, operations, elements, and/or components, but do not preclude the presence or addition of one or more other features, steps, operations, elements, components, and/or groups thereof.

Unless defined otherwise, all technical and scientific terms used herein have the same meaning as commonly understood by one of ordinary skill in the art to which this disclosure belongs. Accordingly, the meaning of specific terms or words used in the specification and the claims should not be limited to the literal or bibliographical meanings, but should be construed in accordance with the spirit of the present disclosure.

Various embodiments of the present disclosure relate to a method and apparatus for signal transmission and reception in a mobile communication system supporting multiple carriers.

Various embodiments of the present disclosure relate to a method and apparatus for signal transmission and reception based on inter-ENB carrier aggregation in a mobile communication system supporting multiple carriers.

The method and apparatus proposed as various embodiments of the present disclosure are applicable to various communication systems, such as the Long-Term Evolution (LTE) system, Long-Term Evolution-Advanced (LTE-A) system, High-Speed Downlink Packet Access (HSDPA) system, High-Speed Uplink Packet Access (HSUPA) system, 3GPP2 High Rate Packet Data (HRPD) system, 3GPP2 Code Division Multiple Access (CDMA) system, 3GPP Wideband Code Division Multiple Access (WCDMA) system, IEEE 802.16m communication system, Evolved Packet System (EPS), and Mobile Internet Protocol (Mobile IP) based system.

First, a description is given of the LTE system architecture with reference to FIG. 1.

FIG. 1 illustrates an LTE system architecture according to various embodiments of the present disclosure.

Referring to FIG. 1, the LTE radio access network is composed of base stations (Evolved Node Bs, ENBs) 105, 110, 115 and 120, a Mobility Management Entity (MME) 125, and a Serving-Gateway (S-GW) 130. A user equipment (UE or terminal) 135 connect to an external network through the ENBs 105 to 120 and the S-GW 130.

The ENBs 105 to 120 correspond to Node Bs of the UMTS (Universal Mobile Telecommunications System) system, but perform more complex functions in comparison to existing Node Bs. The ENBs 105 to 120 is connected to the UE 135 through wireless channels.

In the LTE system, most user traffic including real-time services like VoIP (Voice over IP) services is served by shared channels. Hence, it is necessary to perform scheduling on the basis of collected status information regarding buffers, available transmit powers and channels of UEs. Each of the ENBs 105 to 120 performs this scheduling function. In general, one eNB controls multiple cells. To achieve a data rate of 100 Mbps in a 20 MHz bandwidth, the LTE system utilizes Orthogonal Frequency Division Multiplexing (OFDM) as radio access technology. The ENBs 105 to 120 employs Adaptive Modulation and Coding (AMC) to determine the modulation scheme and channel coding rate conforming to channel states of the UE 135.

The S-GW 130 provides data bearers, and creates and releases data bearers under the control of the MME 125. The MME 125 is connected to multiple ENBs and performs various control functions including mobility management for UEs. The LTE system architecture is described with reference to FIG. 1. Next, a description is given of wireless protocols in the LTE system with reference to FIG. 2.

Figure 2:
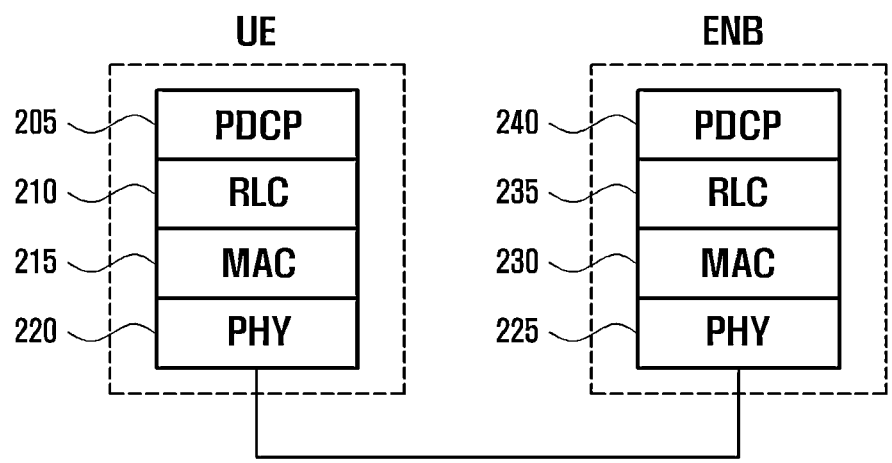
FIG. 2 illustrates a hierarchy of wireless protocols in the LTE system according to various embodiments of the present disclosure.

FIG. 2 illustrates a hierarchy of wireless protocols in the LTE system according to various embodiments of the present disclosure.

Referring to FIG. 2, in the LTE system, a UE and an ENB each include a wireless protocol stack composed of a PDCP (Packet Data Convergence Protocol) layer 205 or 240, an RLC (Radio Link Control) layer 210 or 235, a MAC (Medium Access Control) layer 215 or 230, and a physical (PHY) layer 220 or 225.

The PDCP layer 205 or 240 performs compression and decompression of IP (Internet Protocol) headers. The RLC layer 210 or 235 reconfigures PDCP PDUs (Protocol Data Unit) to a suitable size to conduct ARQ (Automatic Repeat request) operations.

The MAC layer 215 or 230 forms connections with multiple RLC layer entities in the UE. The MAC layer 215 or 230 multiplexes RLC PDUs into MAC PDUs and demultiplexes MAC PDUs into RLC PDUs. The PHY layer 220 or 225 converts higher layer data into OFDM symbols by means of channel coding and modulation and transmits the OFDM symbols through a wireless channel, and converts OFDM symbols received through a wireless channel into higher layer data by means of demodulation and channel decoding and forwards the data to higher layers.

The wireless protocols in the LTE system are described with reference to FIG. 2. Next, a description is given of intra-ENB carrier aggregation in the LTE system.

Figure 3:
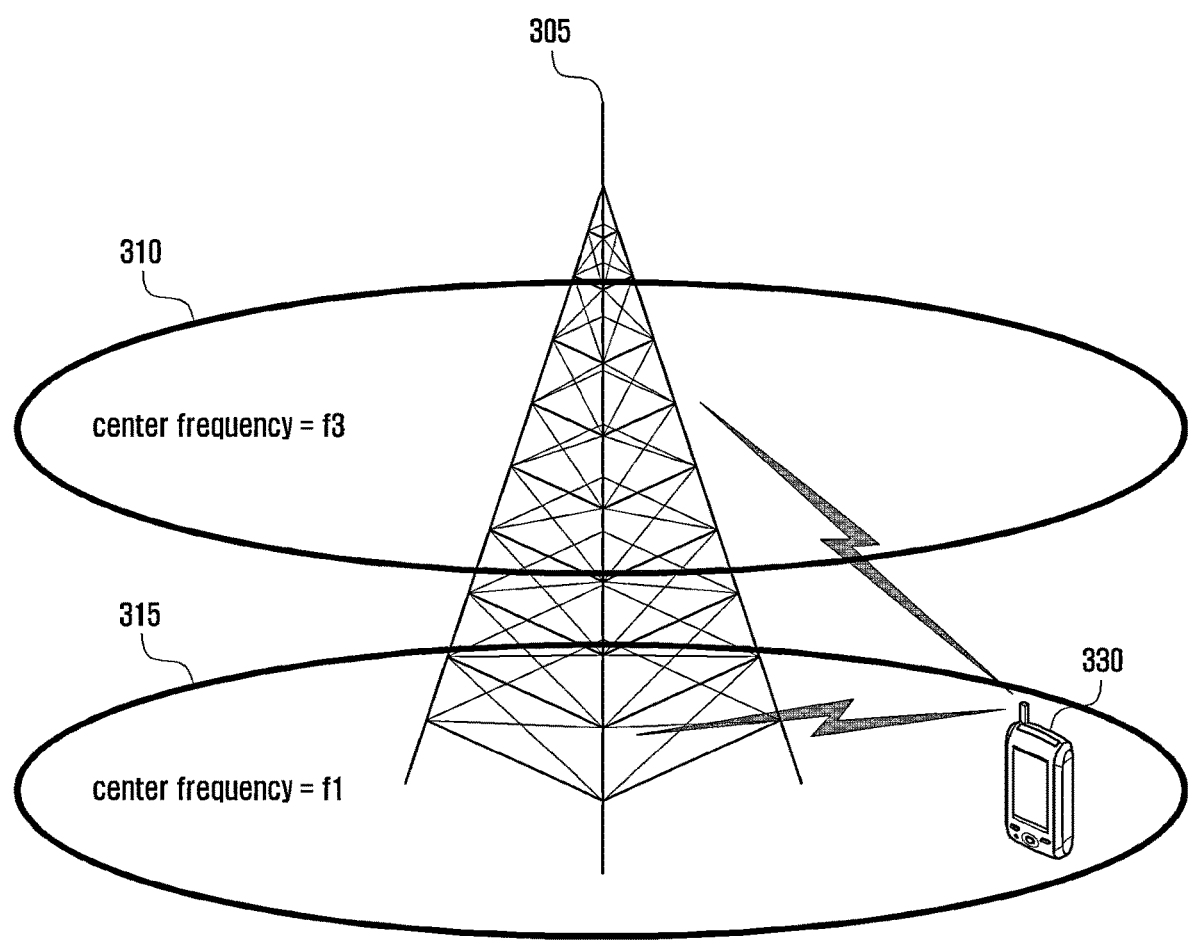
FIG. 3 illustrates intra-ENB carrier aggregation in the LTE system according to various embodiments of the present disclosure.

FIG. 3 illustrates intra-ENB carrier aggregation (CA) in the LTE system according to various embodiments of the present disclosure.

Referring to FIG. 3, one ENB transmits and receives multiple carriers across multiple frequency bands. For example, assume that the ENB 305 transmits a carrier 315 with a center frequency f1 and a carrier 310 with a center frequency f3. In a normal situation, one UE sends and receives data by use of one of the two carriers 310 and 315.

However, a UE having a carrier aggregation capability simultaneously uses multiple carriers to send and receive data. Hence, the ENB 305 assigns a number of carriers to the UE 330 having a carrier aggregation capability according to service conditions, increasing the data rate of the UE 330. As described above, aggregating downlink and uplink carriers transmitted and received by one ENB is referred to as "intra-ENB carrier aggregation." In some cases, unlike the situation of FIG. 3, it is necessary to aggregate downlink carriers and uplink carriers transmitted and received by different ENBs.

Intra-ENB carrier aggregation in the LTE system is described with reference to FIG. 3. Next, a description is given of inter-ENB carrier aggregation in the LTE system with reference to FIG. 4.

Figure 4:
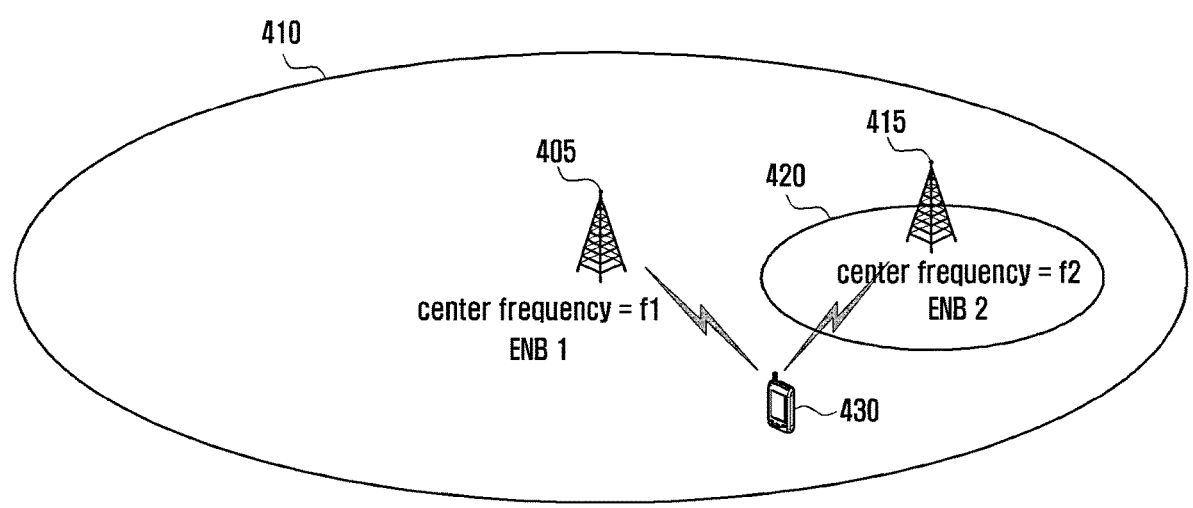
FIG. 4 illustrates inter-ENB carrier aggregation in the LTE system according to various embodiments of the present disclosure.

FIG. 4 illustrates inter-ENB carrier aggregation in the LTE system according to various embodiments of the present disclosure.

In FIG. 4, ENB 1 (405) sends and receives a carrier with a center frequency f1, and ENB 2 (415) sends and receives a carrier with a center frequency f2. When the UE 430 aggregates (combines) the carrier with the downlink center frequency f1 and the carrier with the downlink center frequency f2, this indicates that one UE aggregates carriers sent and received by two or more ENBs, which is referred to as "inter-ENB carrier aggregation" (inter-ENB CA) in various embodiments of the present disclosure. In one embodiment of the present disclosure, inter-ENB carrier aggregation is referred to as "dual connectivity" (DC). For example, configuration of DC mean that inter-ENB carrier aggregation is configured, one or more cell groups are configured, Secondary Cell Group (SCG) is configured, at least one Secondary Cell (SCell) controlled by a different ENB other than the serving ENB is configured, primary SCell (pSCell) is configured, MAC entity for Serving ENB (SeNB) is configured, and two MAC entities are configured in the UE.

Next, a brief description is given of terms or words frequently used to describe embodiments of the present disclosure.

In a traditional sense, it is considered that one cell is formed by a downlink carrier transmitted one ENB and an uplink carrier received by the same ENB. Carrier aggregation can be understood as corresponding to a situation where one UE sends and receives data via multiple cells in parallel. In certain embodiments, the maximum data rate is in positive proportion to the number of aggregated carriers.

In various embodiments of the present disclosure, the fact that a UE receives data through a downlink carrier and transmits data through an uplink carrier corresponds in meaning to a case in which the UE sends and receives data using control and data channels provided by a cell associated with the center frequencies and frequency bands characterizing the carriers. In various embodiments, carrier aggregation is represented as "multiple serving cells are configured," and the words "primary serving cell" (PCell), "secondary serving cell" (SCell) or "activated serving cell" is used. The above terms have the same meaning as in the LTE mobile communication system. Note that terms "carrier", "component carrier" and "serving cell" is used interchangeably in various embodiments.

In various embodiments, a set of serving cells controlled by the same ENB is referred to as Cell Group or Carrier Group (CG). The cell group is divided into Master Cell Group (MCG) and Secondary Cell Group (SCG).

The MCG indicates a set of serving cells controlled by an ENB controlling the PCell (master ENB, MeNB), and the SCG indicates a set of serving cells controlled by an ENB controlling only SCells and not controlling the PCell (slave ENB, SeNB). Whether a serving cell belongs to the MCG or the SCG is notified by the ENB to the UE when the serving cell is configured.

One MCG and one or more SCGs are configured in one UE. In the description, one SCG is configured for ease of description. However, the subject matter of the present disclosure is applied to the case where more than one SCG is configured without significant modification. PCell and SCell are terms indicating the type of serving cells configured in a UE. PCell and SCell are different in some respects. For example, the PCell is always in active state, and the SCell switches between active state and inactive state according to a direction from the ENB. Mobility of a UE is controlled with respect to the PCell, and the SCell are understood as an additional serving cell for data transmission and reception. In embodiments of the present disclosure, PCell and SCell are the same as PCell and SCell defined in 3GPP TS 36.331 or 36.321.

In various embodiments of the present disclosure, a situation where a macro cell and a pico cell coexist with each other is considered. The macro cell is a cell controlled by a macro ENB and covers a relatively wide area. The pico cell is a cell controlled by a SeNB and covers an area significantly narrower than that of the macro cell. Although there is no rigorous criterion to distinguish between the macro cell and the pico cell, it is understood that the macro cell covers a region having a radius of about 500m and the pico cell covers a region having a radius of several tens of meters. In embodiments of the present disclosure, the words "pico cell" and "small cell" are used interchangeably.

Referring back to FIG. 4, if ENB 1 (405) is MeNB and ENB 2 (415) is SeNB, cell 410 with a center frequency f1 is a serving cell belonging to MCG and cell 420 with a center frequency f2 is a serving cell belonging to SCG.

In the following description, other terms are used instead of MCG and SCG for better understanding. For example, the terms "primary set" and "secondary set," or "primary carrier group" and "secondary carrier group" is used. However, it should be noted that they are different in word but the same in meaning. These terms are mainly used to identify whether a given cell is controlled by an ENB controlling the PCell of a UE. Operations of the UE and the cell may differ according to whether the cell is controlled or is not controlled by an ENB controlling the PCell of the UE. Although one or more SCGs are configured in one UE, it is assumed in embodiments that at most one SCG is configured for ease of description. The SCG includes multiple SCells, one of which has a special attribute. In the case of ordinary intra-ENB carrier aggregation, the UE uses Physical Uplink Control Channel (PUCCH) of the PCell to transmit not only Hybrid Automatic Repeat request (HARQ) feedback and Channel State Information (CSI) for the PCell but also HARQ feedback and CSI for the SCell. This is to apply carrier aggregation to a UE not supporting simultaneous uplink transmissions. In the case of inter-ENB carrier aggregation, it is practically impossible to transmit HARQ feedback and CSI for SCells via the PUCCH of the PCell. This is because HARQ feedback should be delivered within a corresponding Round Trip Time (RTT) of about 8 ms but the transmission delay between MeNB and SeNB is greater than the HARQ RTT. As such, PUCCH transmission resources are assigned to one of SCells belonging to the SCG, HARQ feedback and CSI for SCG SCells are transmitted through the PUCCH. Such a special SCell is referred to as "primary SCell" (pSCell). In the following description, inter-ENB carrier aggregation is used interchangeably with dual connectivity.

Figure 5:
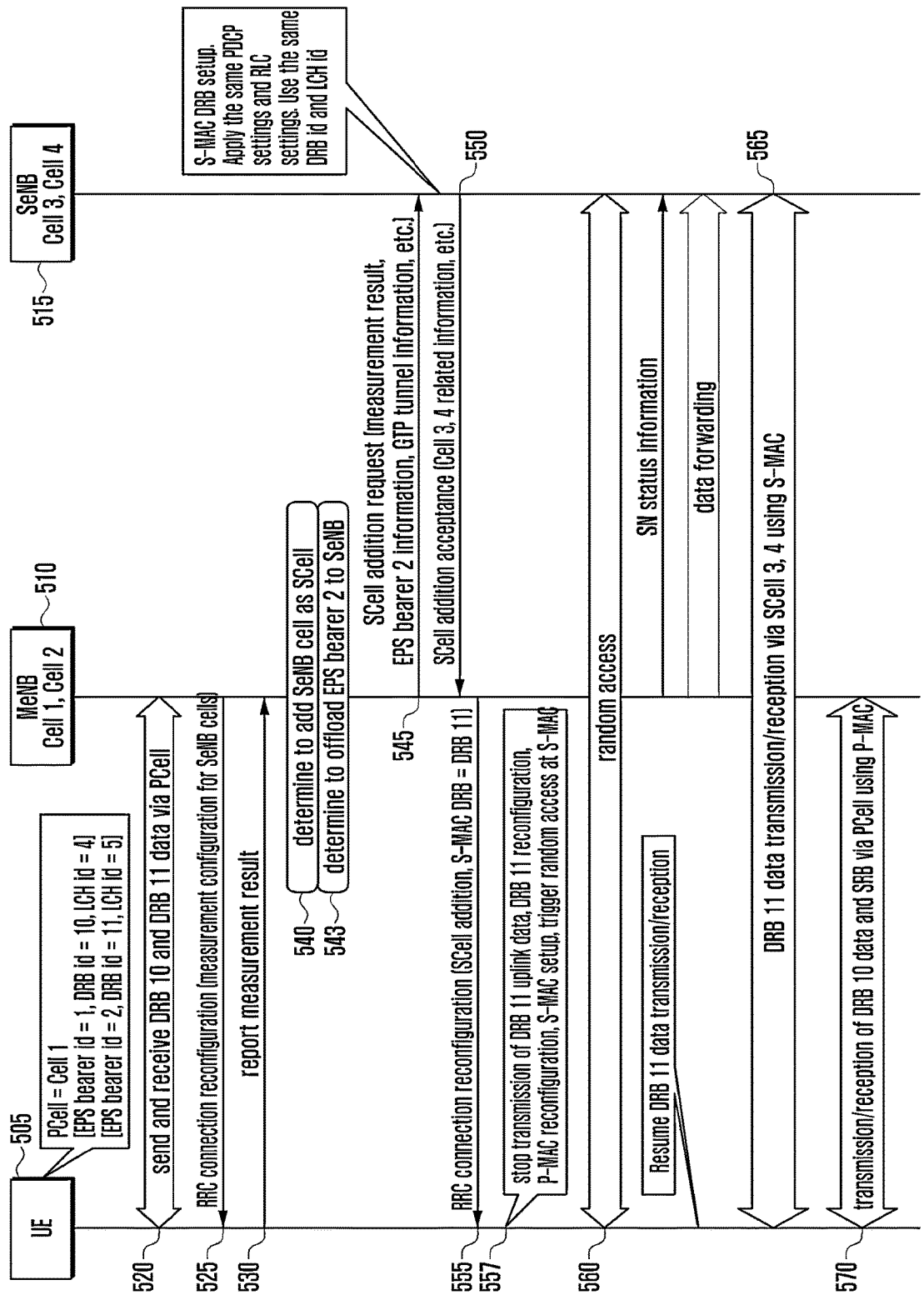
FIG. 5 is a sequence diagram of a procedure for configuring P-MAC (or MCG-MAC) and S-MAC (or SCG-MAC)

FIG. 5 is a sequence diagram of a procedure for configuring P-MAC (or MCG-MAC) and S-MAC (or SCG-MAC).

Referring to FIG. 5, in a mobile communication system composed of UE 505, MeNB 510 and SeNB 515, cell 1 and cell 2 are controlled by MeNB 510, and cell 3 and cell 4 are controlled by SeNB 515. PCell of UE 505 is cell 1, and two EPS bearers are configured in UE 505. EPS bearer 1 has a data radio bearer (DRB) ID of 10, logical channel (LCH) ID of 4, and provides a delay sensitive real-time service, e.g., VoIP (Voice over Internet Protocol) service. EPS bearer 2 has a DRB ID of 11 and LCH ID of 5 and provides a service requiring a large amount of data transmission and reception such as a file download service. At step 520, UE 505 sends and receives data of DRB 10 and DRB 11 via PCell. A signaling radio bearer (SRB) is also configured in UE 505, and UE 505 sends and receives SRB data also via PCell. An EPS bearer is mapped with a DRB, is considered as a higher level concept of DRB, and is arranged between the UE and the gateway of the LTE network.

At step 525, to configure an additional serving cell in UE 505, MeNB 510 sends UE 505 a command to measure cell 3 or cell 4. Upon reception of the command, UE 505 performs measurement on the indicated cell. If channel quality of the cell satisfies a preset condition, at step 530, UE 505 reports to MeNB 510 by sending a suitable RRC control message containing the measurement result via SRB. MeNB 510 notifies UE 505 of a frequency to be measured instead of a cell to be measured. That is, MeNB 510 sends UE 505 a command to measure the frequency corresponding to cell 3 or cell 4 at step 525. The measurement result is contained in a preset RRC control message for transmission. A condition to trigger a measurement result report corresponds to, for example, when the channel quality of a neighboring cell as to the indicated frequency is better than a preset threshold for a preset time, or when the channel quality of a neighboring cell as to the indicated frequency is better than that of PCell by a preset threshold for a preset time.

At step 540, MeNB 510 determines to add a cell of SeNB 515 to UE 505 as SCell. MeNB 510 determines to offload data of EPS bearer 2 to the added SCell at step 543.

At step 545, MeNB 510 sends a control message requesting SCell addition to SeNB 515. The control message contains at least a portion of information described in Table 1 below.

TABLE 1

| Name | Description |
| --- | --- |
| SCell candidate information | IDs of cells among SeNB cells configurable as SCell and measurement results as to the cells. SeNB determines a cell to be configured as SCell on the basis of measurement results and cell load conditions. When downlink coverages of cells are similar, SeNB may configure a cell that is not recommended as SCell candidate by MeNB as SCell. |
| TAG ID information | Information on ID of TAG to be configured at SeNB. To prevent reuse of ID already used by MeNB, MeNB determines this ID and notifies SeNB of determined ID. TAG (Timing Advance Group) indicates a set of serving cells having the same uplink transmission timing, and is specified in TS 36.321 and TS36.331. |
| Information on bearer to be offloaded | Information on EPS bearer to be offloaded to SeNB (or to SCAG serving cell). Required QoS information, EPS bearer ID, PDCP configuration information, RLC configuration information, DRB ID, LCH information is included. The bearer to be offloaded to SeNB corresponds to S-MAC DRB in UE. LCH information includes LCH ID. RLC configuration is specified by RLC-config in TS 36.331, PDCP configuration is specified by PDCP-config, LCH is specified by logicalChannelConfig. |
| Call acceptance control information | Information provided by MeNB to enable SeNB to determine whether to accept or reject SCell addition request, such as required data rate, expected amount of uplink data and expected amount of downlink data. |
| GTP Tunnel information | Information on GTP Tunnel to be used for uplink data forwarding. |

SeNB 515 performs call acceptance control. Upon determining to accept the SCell addition request, SeNB 515 determines a cell to be SCell, configures the cell as SCell, and configures DRB for the bearer to be offloaded. SeNB 515 reuses LCH ID used by MeNB 510 to minimize the influence on S-MAC DRB. For example, SeNB 515 sets LCH ID to 5 to configure DRB for EPS bearer 2.

To assign DRB ID for S-MAC DRB, SeNB 515 reuses the same value used by MeNB 510. This is because assigning new DRB ID to S-MAC DRB appears to UE 505 as a new RDB setting, causing initiation of detrimental operation, for example, discarding current DRB buffer data or forwarding the same to the higher layer.

SeNB 515 reuses PDCP settings and RLC settings used by MeNB 510 to configure the PDCP entity and RLC entity of S-MAC DRB. Use of different settings causes UE 505 to break up the current DRB and reconfigure DRB according to new settings, leading to initiation of detrimental operation described above. At step 550, SeNB 515 reconfigures the PDCP entity and RLC entity of S-MAC DRB and sends a control message indicating acceptance of SCell addition to MeNB 510. The control message contains at least a portion of information described in Table 2 below.

TABLE 2

| Name | Description |
| --- | --- |
| SCellToAddMod | Information related to SCells configured by SeNB, i.e., SCAG SCells (e.g., cell 3 and cell 4). The following is included: sCellIndex-r10, cellIdentification-r10, radioResourceConfigCommonSCell-r10, radioResourceConfigDedicatedSCell-r10, TAG-related information |
| PUCCH information for PUCCH SCell | PUCCH (Physical Uplink Control Channel) is configured in at least one SCell among SCells belonging to SCAG. Uplink control information such as HARQ feedback, CSI (Channel Status Information is a higher level concept of Channel Quality Indicator) or SR (Scheduling Request) is transmitted through PUCCH. Hereinafter, SCell through which PUCCH is transmitted is referred to as PUCCH SCell. The PUCCH SCell identifier and PUCCH configuration information are lower level information of this information. |
| GTP Tunnel information | Information on GTP Tunnel to be used for downlink data forwarding. |
| UE identifier | C-RNTI to be use by UE in SCells of non-primary set. Hereinafter, referred to as C-RNTI_SENB. |
| Bearer configuration information | Configuration information on the bearer to be offloaded. A list of bearers to be offloaded and per-bearer configuration information are included. If bearer configurations are identical, only the list of bearers to be offloaded is included. |
| MAC configuration information | Various MAC configuration information to be applied to SCAG serving cells, such as DRX related information, PHR configuration information and BSR configuration information. Later, this information is delivered to UE as S-MAC configuration information, and is omitted if identical to existing MAC configuration information. |

Upon reception of the control message, at step 555, MeNB 510 creates a RRC control message indicating serving cell addition to UE 505. The control message contains at least a portion of information described in Table 3 below. In addition, MeNB 510 stops data transmission and reception for S-MAC DRB.

TABLE 3

| Name | Description |
|---|---|
| SCellAddMod | Information sent by SeNB is used as is. That is, the same as SCellAddMod in Table 2. SCellAddMod is used per SCell and is lower level information of SCellAddModList. |
| PUCCH information for PUCCH SCell | Information sent by SeNB is used as is. That is, the same as PUCCH information for PUCCH SCell in Table 2. |
| SCAG information | Information on SCells belonging to SCAG among configured SCells (or information on SCells to be connected with S-MAC). This is IDs of above SCells or IDs of TAGs belonging to SCAG. |
| UE identifier | C-RNTI to be use by UE in SCAG serving cells. Hereinafter, referred to as C-RNTI_SENB. |
| Offload bearer information | Information on bearers to be processed by SeNB (i.e., S-MAC DRB). For UE, information on bearers to be sent and received through SCAG serving cells (or bearers to be connected with S-MAC). A list of bearers and bearer configuration information are included. Bearer configuration information is omitted if bearer configurations are identical. Bearer IDs of the bearer list is EPS bearer ID, DRB ID or LCH ID. For example, if DRB ID, 11 is signaled. |
| S-MAC configuration information | Various MAC configuration information related to non-primary set serving cells. For example, DRX related information, PHR configuration information and BSR configuration information is included. This is omitted if identical to current MAC configuration information. UE configures DRX, PHR and BSR of S-MAC by use of MAC configuration information of P-MAC. |

Upon reception of the RRC connection reconfiguration message, at step 557, UE 505 performs the following actions in sequence on the basis of information contained in the control message.

Start to use (or create) S-MAC
Stop transmission of data of S-MAC DRB
Reconfigure PDCP of DRB satisfying condition 1 of S-MAC DRB
Reconfigure RLC of DRB satisfying condition 1 of S-MAC DRB
Connect S-MAC DRB with S-MAC
Connect DL-SCH of SCAG with S-MAC
Connect UL-SCH of SCAG with S-MAC
Trigger random access at S-MAC In certain embodiments, DRB satisfying condition 1 is DRB in RLC AM (Acknowledged Mode) and whose "statusReportRequired" is set to "yes." "statusReportRequired" is configuration information of PDCP-config. When "statusReportRequired" is set to "yes," the UE has to trigger PDCP status reporting after performing handover for lossless handover in relation to the corresponding DRB. In the present disclosure, the UE is configured to trigger PDCP status reporting when DRB connection is changed from regular MAC to S-MAC in addition to handover.

Additionally, UE 505 performs reconfiguration for P-MAC as follows.

Release connection between S-MAC DRB and P-MAC
Release connection between DL-SCH of SCAG and P-MAC
Release connection between UL-SCH of SCAG and P-MAC
Flush (or empty) HARQ buffer with MAC PDUs containing S-MAC DRB data among uplink HARQ buffers of PCAG serving cells
Discard unsent BSR and PHR and newly generate BSR and PHR According to P-MAC settings.

The actions related with S-MAC and actions related with P-MAC are performed in parallel or in any order.

At step 560, UE 505 establishes downlink synchronization with PUCCH SCell and performs random access at PUCCH SCell. More specifically, UE 505 sends a random access preamble using a preset frequency resource of PUCCH SCell in a preset time duration and attempts to receive a random access response message for a time duration specified with reference to the transmission time of the preamble. If a valid random access response message is received, UE 505 analyzes an uplink Timing Advance Command contained in the response message and adjusts the uplink transmission timing. UE 505 generates MAC PDUs to be sent to PUCCH SCell by use of the uplink transmission resource indicated by uplink grant information contained in the response message. Upon reception of uplink grant through the random access response message, S-MAC triggers BSR, C-RNTI MAC CE and BSR MAC CE are added to the MAC PDU, and C-RNTI_SENB is written in C-RNTI MAC CE. Buffer state information indicating the amount of transmissible data stored in SeNB DRB is written in BSR MAC CE. C-RNTI MAC CE and BSR MAC CE are specified in section 6.1.3 of TS 36.321. UE 505 checks whether PDCCH indicating initial transmission and addressed by C-RNTI_SENB is received from PUCCH SCell. When such PDCCH is received within a preset time duration, UE 505 determines that random access is successful and resumes transmission and reception of S-MAC DRB data.

In certain embodiments, for each DRB satisfying condition 1 among S-MAC DRBs, UE 505 generates a PDCP status report and sends the same as first data of the DRB.

Thereafter, at step 565, UE 505 connects DRB 11 with SCell 3 and SCell 4 (i.e., serving cell of SCAG) to transmit and receive DRB 11 data through SCell 3 and SCell 4. At step 570, UE 505 connects DRB 10 and SRB with PCell (i.e., serving cell of PCAG) to transmit and receive DRB 10 data through PCell. In addition to DCCH and DTCH, P-MAC connects PCCH, BCCH, MCCH and MTCH with corresponding transport channels.

Figure 6:
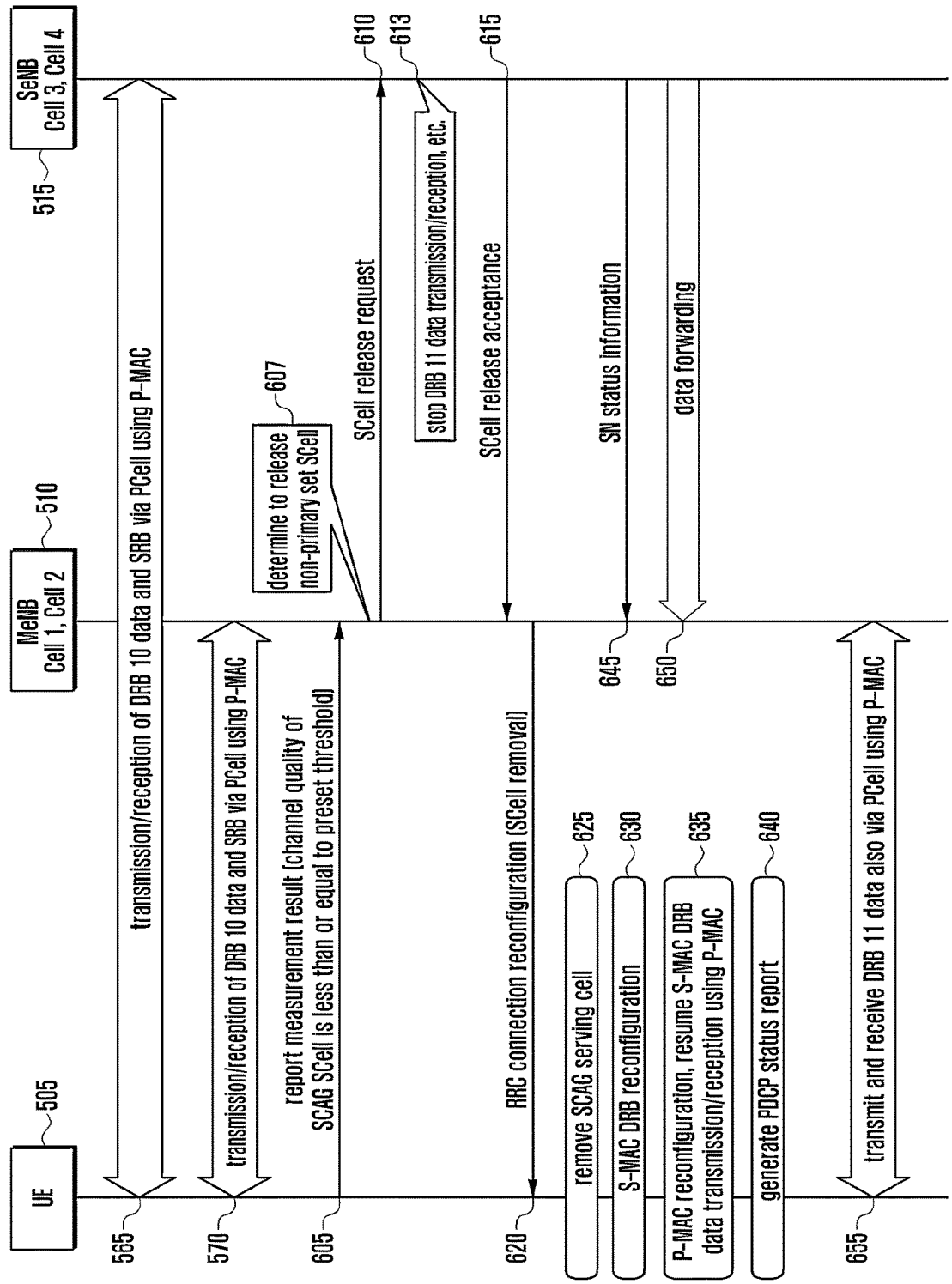
FIG. 6 is a sequence diagram of a procedure for data transmission and reception after releasing SCell according to various embodiments of the present disclosure.

FIG. 6 is a sequence diagram of a procedure for data transmission and reception after releasing SCell according to various embodiments of the present disclosure.

Referring to FIG. 6, sometime later, at step 605, UE 505 reports a measurement result indicating that channel quality of SCAG serving cell is less than or equal to a preset threshold. If channel quality of PUCCH SCell among SCAG serving cells is less than or equal to the preset threshold, at step 607, MeNB 510 determines to release all the SCAG serving cells.

At step 610, MeNB 510 sends a control message indicating SCell release for UE 505 to SeNB 515. Upon reception of the control message, at step 613, SeNB 515 performs the following actions.

When some of SCAG serving cells are released and PUCCH SCell is not included among the serving cells to be released
Send preset MAC CE (Activation/Deactivation MAC CE, refer to TS 36.321) to deactivate SCells to be released.
Release indicated SCells
When some of SCAG serving cells are released and PUCCH SCell is included among the serving cells to be released (i.e., PUCCH SCell is absent after SCell release) or all SCAG serving cells are released
Send preset MAC CE (first MAC CE) to deactivate SCells and prevent uplink transmission of PUCCH SCell.
Release all SCAG serving cells Stop S-MAC DRB data transmission and reception
Reconfigure RLC entity and PDCP entity of S-MAC DRB
Proceed to step 645 and send SN status information In certain embodiments, the first MAC CE is composed of MAC sub-headers without payload and commands UE 505 to perform the following actions.

Among currently active SCAG serving cells, deactivate remaining serving cells excluding PUCCH SCell
Prevent uplink transmission of PUCCH SCell (e.g., Channel Quality Indicator, Scheduling Request or random access preamble)

At step 615, SeNB 515 sends a control message indicating acceptance of SCell release to MeNB 510.

At step 620, MeNB 510 sends a control message indicating SCell release to UE 505. The control message contains ID information of SCells to be released. Upon reception of the control message, UE 505 performs the following actions.

When some of SCAG serving cells are released and PUCCH SCell is not included among the serving cells to be released
Release indicated SCell
Maintain S-MAC DRB data transmission and reception
When some of SCAG serving cells are released and PUCCH SCell is included among the serving cells to be released (i.e., PUCCH SCell is absent after SCell release) or all SCAG serving cells are released
Release all SCAG serving cells (step 625)
Stop S-MAC DRB data transmission and reception
Stop S-MAC usage (or remove S-MAC)
Reconfigure PDCP of DRB satisfying condition 1 among S-MAC DRBs (step 630)
Reconfigure RLC of DRB satisfying condition 1 among S-MAC DRBs (step 630)
Connection setup between S-MAC DRB and P-MAC
Resume S-MAC DRB data transmission and reception (step 635)
Generate PDCP status report for DRB satisfying condition 1 among S-MAC DRBs (step 640)

Thereafter, at step 655, UE 505 sends and receives S-MAC DRB data via P-MAC and PCAG serving cell (e.g., PCell). At step 645, SeNB 515 sends an SN status information message to MeNB 510. At step 650, SeNB 515 forwards data to MeNB 510. Using forwarded data, MeNB 510 performs S-MAC DRB transmission and reception with UE 505. The SN status information message includes at least a portion of information regarding S-MAC DRB satisfying condition 1 described in Table 4 below.

TABLE 4

| Name | Description |
|---|---|
| UL PDCP PDU reception status information | Bitmap with a preset size, where $n^{th}$ bit indicates status of reception for PDCP SDU with PDCP SN of m. m = (PDCP SN of first PDCP SDU not received + n) modulo (Max PDCP SN + 1) |
| UL COUNT | COUNT of first PDCP SDU not received. COUNT is a 32-bit integer and increases by 1 for each PDCP SDU. COUNT is a concatenated value of HFN and PDCP SN. |
| DL COUNT | COUNT to be assigned to first PDCP SDU among PDCP SDUs without assigned PDCP SNs. |

The PDCP status report is a control message exchanged between PDCP transceiver entities to prevent packet loss when RLC cannot perform ARQ temporarily owing to RLC entity reconfiguration. The PDCP status report is composed of FMS (First Missing Sequence) and a bitmap, and is specified in TS 36.323.

At step 675, MeNB 510 and SeNB 515 perform data forwarding as follows.

Downlink data: among PDCP SDUs stored in the buffer, forward PDCP SDUs whose successful transmission is uncertain.
For PDCP SDUs with assigned PDCP SNs, forward PDCP SDU whose GTP header includes assigned PDCP SN information
For PDCP SDUs without assigned PDCP SNs, forward PDCP SDU whose GTP header does not include PDCP SN information
Uplink data
Forward PDCP SDUs that are successfully received but are out of sequence. In certain embodiments, PDCP SN information is inserted in the GTP header.

Next, a description is given of a method and apparatus for generating and transmitting a power headroom report (PHR) in a mobile communication system. In addition, a description is given of a method and apparatus for generating and transmitting a PHR in a user equipment supporting dual connectivity (DC).

One embodiment of the present disclosure relates to a new PHR format and a condition to use the new PHR format.

PHRs may have a first format (normal), a second format (extended), and a third format (dual). For PHR of MCG, when dual connectivity is not configured, the first format or second format is used under direction of the ENB; and when dual connectivity is configured, the third format is used. For PHR of SCG, the third format may always be used.

A condition or timing to trigger PHR is provided. A trigger event of a first type triggers PHR in a corresponding cell group, and a trigger event of a second type triggers PHR in all cell groups. The second type trigger events include a path loss trigger and a serving cell activation trigger. When a path loss trigger occurs, PHR is triggered at a second point in time (at the timing when uplink transmission resource becomes first available) in the corresponding cell group, and is triggered at a third point in time (at the timing when uplink transmission resource becomes first available) in the other cell group. When a serving cell activation trigger occurs, PHR is triggered at a fourth point in time (at the timing when all serving cells are completely activated) in the corresponding cell group and in the other cell group.

A dual connectivity enabled UE is connected with two ENBs including MeNB and SeNB and triggers PHR to send a PHR to each ENB.

PHR is triggered by various events as follows.
When path loss of a serving cell has changed by a preset threshold or more
When a PHR function is configured
When a serving cell is activated
When periodic PHR-Timer expires More detailed information for events triggering PHR is described in section 5.4.6 in TS 36.321.

When a PHR triggering event occurs, the dual connectivity enabled UE triggers a PHR and performs PHR transmission to one of the two ENBs or triggers a PHR and performs PHR transmission to both of the two ENBs. This is because a PHR is useful to only one or both of the two ENBs according to the type of the PHR triggering event.

FIG. 7 illustrates a PHR format. PHRs include the first format (section 6.1.3.6 in TS 36.321), the second format (section 6.1.3.6a in TS 36.321), and the third format. The third format is shown in FIG. 7.

FIG. 7 illustrates a PHR format according to various embodiments of the present disclosure.

In FIG. 7, indicia 700-730 denote a bitmap indicating the serving cell whose PH is included in the PHR among aggregated serving cells. Each bit of the bitmap indicates one SCell index corresponding to one SCell. The 'P' bit 735 indicates whether UE maximum transmit power PCMAX is affected by P-MPR. For a serving cell without PUSCH transmission at a subframe where PHR is transmitted, the transmission format to be used for PH computation (amount of transmission resources and MCS level) is determined. In certain embodiments, to correctly interpret reported PH, the ENB has to know whether PH of a serving cell contained in the PHR is computed in consideration of actual PUSCH transmission or is computed using a preset transmission format. To this end, the 'V' bit 740 is used as a 1-bit indicator. To report PH for a cell, when the PH of the cell is computed on the basis of actual PUSCH transmission (i.e., actual transmission format), the UE sets the V bit to one value (e.g., 0). For a cell without PUSCH transmission, when the PH of the cell is computed on the basis of the reference format (i.e., RB count=1, $\Delta$TF=0), the UE sets the V bit to another value (e.g., 1).

Indicia 750 through 775 denote PH and PCMAX values, respectively. In successive bytes, type 2 PH 750 and PCMAX 755 for PCell, type 1 PH 760 and PCMAX 765 for PCell, PH 770 and PCMAX 775 for SCell with the lowest index, PH and PCMAX for SCell with the second lowest index, PH and PCMAX for SCell with the third lowest index, and PH and PCMAX for SCell with the fourth lowest index (ascending order of SCell indexes) are stored in sequence. Type 2 PH is reported for PCell and pSCell only and is computed in consideration of not only transmit output power for PUSCH but also transmit output power for PUCCH (Physical Uplink Control Channel). Type 2 PH for PCell is included when simultaneous PUSCH/PUCCH transmission is configured in PCell, and type 2 PH for pSCell is included when simultaneous PUSCH/PUCCH transmission is configured in pSCell. Type 2 PH for PCell is stored in a byte immediately following the bitmap, and type 2 PH 780 for pSCell is stored in the last byte or in a byte immediately before the last byte.

Configuration of simultaneous PUSCH/PUCCH transmission for pSCell is determined by the SeNB and notified to the UE via control information for SCG settings.

The UE determines whether to insert type 2 PH of pSCell in the PHR with reference to the configuration of simultaneous PUSCH/PUCCH transmission.

Activation of a serving cell is indicated by Activation/Deactivation MAC CE (A/D MAC CE). When A/D MAC CE having at least one SCell bit set to '1' is received, the UE starts activation.

A/D MAC CE is a MAC layer control message indicating activation or deactivation of SCells configured in the UE, and is composed of a MAC sub-header and payload.

The MAC sub-header includes LCD (Logical Channel ID) indicating the type of the payload, 'E' bit indicating presence of another MAC sub-header, and the like.

Figure 8:
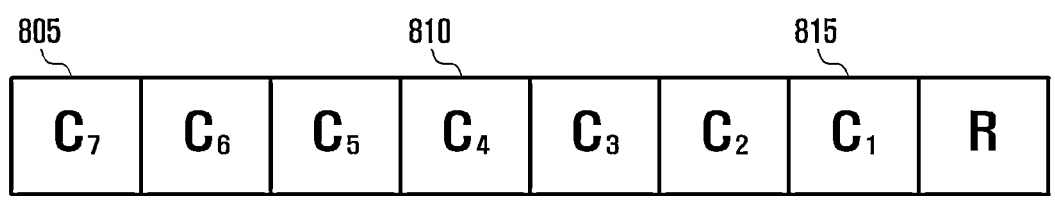
FIG. 8 illustrates an A/D MAC CE according to various embodiments of the present disclosure.

FIG. 8 illustrates a bitmap representing payload according to various embodiments of the present disclosure.

Referring to FIG. 8, the payload is represented by a 1-byte bitmap, whose C7 bit 805 indicates the state of a serving cell with SCell index of 7 (SCell 7), whose C4 bit 810 indicates the state of SCell 4, and whose C1 bit 815 indicates the state of SCell 1. In the event that one bit is set to '1', if the corresponding SCell is already activated, the UE maintains the current state; and, if the corresponding SCell is not activated, the UE activates the SCell. In the event that one bit is set to '0', if the corresponding SCell is already deactivated, the UE maintains the current state; and, if the corresponding SCell is activated, the UE deactivates the SCell.

As one A/D MAC CE contains activation indications for multiple SCells, an activation command is issued to an already activated serving cell.

Activation of a serving cell includes turning on a new RF element to receive a signal from the serving cell or reconfiguring existing RF elements to cover the serving cell. RF reconfiguration requires a considerable time. It is possible to compute PH information for the serving cell when path loss of the serving cell is determined after completion of activation of the serving cell. Hence, it is desirable to trigger PHR after the serving cell is completely activated.

When the UE is already in activated state, in response to an activation command, it is possible to compute PH and generate a PHR within a relatively short time.

If multiple serving cells are activated at different timings in response to occurrence of a PHR triggering event, a PHR triggered for a serving cell activated early delays transmission of a PHR triggered for a serving cell activated later. Information contained in a PHR triggered for a serving cell activated later is more useful than information contained in a PHR triggered for a serving cell activated early. It is desirable to reduce the number of PHRs triggered by one event. Considering the above factors, the present disclosure provides a method whereby the UE select suitable PHR trigger timings so as to minimize the number of PHR triggers with each PHR having the most useful information.

More specifically, when a PHR triggering event occurs in one cell group (CG), the UE having dual connectivity checks whether the PHR triggering event is of type 1 or type 2. If the PHR triggering event is of type 1, the UE triggers PHR only for the corresponding cell group; and if the PHR triggering event is of type 2, the UE triggers PHR for all the cell groups. In certain embodiments, for type 1 event, the UE triggers PHR at a first point in time; and for type 2 event, the UE triggers PHR at a second point in time, a third point in time or a fourth point in time. As described above, the UE trigger PHR at a preset point in time according to the type of a PHR triggering event.

Figure 9:
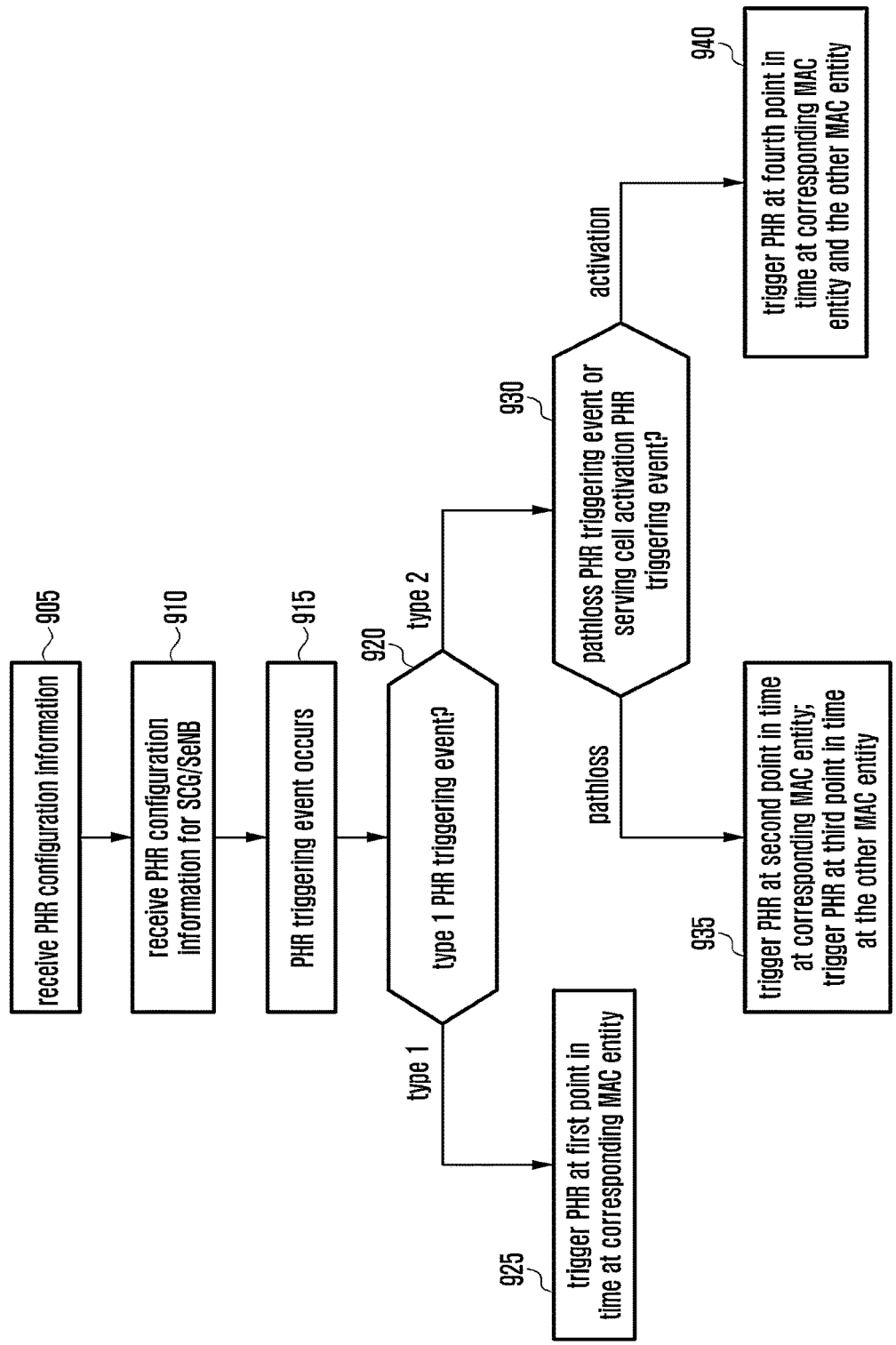
FIG. 9 is a flowchart illustrating UE operation according to various embodiments of the present disclosure.

FIG. 9 is a flowchart illustrating UE operation according to various embodiments of the present disclosure.

Referring to FIG. 9, at step 905, the UE not having dual connectivity receives PHR configuration information and simultaneous PUSCH/PUCCH transmission information. When PHR information and simultaneous PUSCH/PUCCH transmission information are received before dual connectivity setup, the UE is aware that the received information is related with MCG/MeNB without explicit indication. The PHR configuration information includes an indication to whether the PHR format is the first format (normal) or the second format (extended).

The UE uses the indicated format to generate PHR for MCG/MeNB. The PHR configuration information further includes various timer information (periodicPHR-Timer and prohibitPHR-Timer) and path loss reference value (dl-PathlossChange). When the simultaneous PUSCH/PUCCH transmission information (simultaneousPUCCH-PUSCH) is set to 'true', if PUCCH transmission of PCell and PUSCH transmission of MCG serving cell overlap in the time domain, the UE performs PUCCH transmission using PUCCH transmission resources and PUSCH transmission using PUSCH transmission resources at the same time. When the simultaneous PUSCH/PUCCH transmission information is not set to 'true', if PUCCH transmission of PCell and PUSCH transmission of MCG serving cell overlap in the time domain, the UE performs PUCCH transmission and PUSCH transmission using PUSCH transmission resources only at the same time.

Thereafter, at step 910, the UE receives PHR configuration information and simultaneous PUSCH/PUCCH transmission information for SCG/SeNB. In certain embodiments, relatedness of the above information with SCG/SeNB is explicitly indicated. For example, the above information is transmitted as a portion (or as lower level information) of SCG configuration information, or is transmitted as a portion (or as lower level information) of second MAC configuration information. According to the above control information, the UE selects the PHR format and identifies various parameters related with PHR triggering. The format for SCG/SeNB is not separately signaled, and use of a preset format (e.g., third format) is determined in advance.

To be more specific about the format, the first format is used to store PH information for one serving cell, the second format is used to store PH information for one cell group, and the third format is used to store PH information for both MCG and SCG. FIG. 7 illustrates the third format. When dual connectivity is not configured, the UE uses one of the first format and the second format according to the direction of the ENB. When dual connectivity is configured, the UE uses the third format for MCG/MeNB by itself although use of the first or second format has been set and there is no explicit format change indication from the ENB. For SCG/SeNB, format information is not separately signaled, and the UE always uses the third format.

For example, to determine the PHR format indicated by PCell, the UE uses one of the first format and the second format according to the direction of the ENB when dual connectivity is not configured, and uses the third format regardless of the previous ENB format indication when dual connectivity is configured. In certain embodiments, dual connectivity is configured, SCG is configured, PSCell is configured, the second MAC entity is configured, and at least two MAC entities are configured are the same in meaning.

When the simultaneous PUSCH/PUCCH transmission information for SCG/SeNB is set to 'true', if PUCCH transmission of PSCell and PUSCH transmission of SCG serving cell overlap in the time domain, the UE performs PUCCH transmission and PUSCH transmission at the same time by using both PUCCH transmission resources of PSCell and PUSCH transmission resources of SCG serving cell. When the simultaneous PUSCH/PUCCH transmission information is not set to 'true', if PUCCH transmission of PSCell and PUSCH transmission of SCG serving cell overlap in the time domain, the UE performs PUCCH transmission and PUSCH transmission by using PUSCH transmission resources only.

When the simultaneous PUSCH/PUCCH transmission information for MCG/MeNB is set to 'true', the UE inserts type 2 PH of PCell in the PHR of the third format. When the simultaneous PUSCH/PUCCH transmission information for MCG/MeNB is not set to 'true', the UE does not insert type 2 PH of PCell in the PHR.

When the simultaneous PUSCH/PUCCH transmission information for SCG/SeNB is set to 'true', the UE inserts type 2 PH of PSCell in the PHR of the third format. When the simultaneous PUSCH/PUCCH transmission information is not set to 'true', the UE does not insert type 2 PH of PSCell in the PHR.

At step 915, a PHR triggering event occurs. The PHR triggering event is one of the four cases below.

After expiration of prohibitPHR-Timer for a cell group (or MAC entity), path loss of a serving cell belonging to the cell group is changed by a preset threshold or more. This is referred to as occurrence of pathloss PHR triggering event for MCG or SCG.

PHR function is configured for a serving cell group. This is referred to as occurrence of configuration PHR triggering event for MCG or SCG.

Activation of a serving cell in a serving cell group. This correspond to reception of A/D MAC CE whose bit corresponding to at least one serving cell satisfying a preset condition among serving cells of the cell group is set to '1'. The preset condition is satisfied when a serving cell is not PCell or PSCell. This is referred to as occurrence of serving cell activation PHR triggering event for MCG or SCG.

Expiration of periodicPHR-Timer for a serving cell group. This is referred to as occurrence of periodic PHR triggering event for MCG or SCG.

At step 920, the UE examines the type of the PHR triggering event. If first type, the procedure proceeds to step 925. If second type, the procedure proceeds to step 930. A PHR triggering event of the first type is triggered only in the corresponding cell group, and the periodic PHR triggering event and configuration PHR triggering event are of the first type. For example, upon expiration of the periodic timer of MCG/MeNB, the UE triggers PHR for MCG/MeNB only. Upon configuration of new PHR in SCG/SeNB, the UE triggers PHR for SCG/SeNB only. A PHR triggering event of the second type is triggered not only in the corresponding cell group but also in the other cell group, and the pathloss PHR triggering event and the serving cell activation PHR triggering event are of the second type. For example, when pathloss of one serving cell among MCG serving cells is changed by a preset threshold or more, the UE triggers PHR not only for MCG/MeNB but also for SCG/SeNB. When one serving cell is activated among SCG serving cells, the UE triggers PHR not only for SCG/SeNB but also for MCG/MeNB.

At step 925, the UE triggers PHR at the first point in time for the cell group in which the PHR triggering event has occurred. PHR triggering for a cell group in which a PHR triggering event has occurred indicate PHR triggering for a cell group whose periodic timer has expired or PHR triggering for a cell group in which a new PHR is configured. PHR triggering for a cell group corresponds in meaning to PHR triggering at the MAC entity configured for the cell group. A PHR triggered for a cell group is transmitted via a serving cell belonging to the cell group and is received by the ENB managing the cell group. For example, when a PHR triggering event of the first type occurs in MCG/MeNB/MCG-MAC, a PHR is triggered at MCG-MAC and is sent via MCG. Likewise, when a PHR triggering event of the first type occurs in SCG/SeNB/SCG-MAC, a PHR is triggered at SCG-MAC and is sent via SCG. PHR transmission via MCG or SCG indicates that the PHR is transmitted through PUSCH transmission resources of MCG serving cell or through PUSCH transmission resources of SCG serving cell. In certain embodiments, the first point in time indicates the time at which the PHR triggering event has occurred, for example, the time at which a periodic PHR timer has expired or a PHR configuration is completed.

At step 930, the UE examines whether the PHR triggering event is a pathloss PHR triggering event or serving cell activation PHR triggering event. If it is a pathloss PHR triggering event, the procedure proceeds to step 935. If it is a serving cell activation PHR triggering event, the procedure proceeds to step 940.

At step 935, the UE triggers PHR not only for CG/MAC entity at which the PHR triggering event has occurred but also for the other CG/MAC entity. In certain embodiments, the UE triggers PHR at the second point in time for CG/MAC entity at which the PHR triggering event has occurred, and triggers PHR at the third point in time for the other CG/MAC entity. The second point in time indicates, after occurrence of the PHR triggering event, the time when a new uplink transmission resource becomes first available at the CG/MAC entity at which the PHR triggering event has occurred. The third point in time indicates, after occurrence of the PHR triggering event, the time when a new uplink transmission resource becomes first available at the other CG/MAC entity unrelated with occurrence of the PHR triggering event. For example, when a PHR triggering event has occurred because path loss of MCG serving cell is changed by a preset threshold or more, the second point in time corresponds to the time when a new uplink transmission resource becomes available at the MCG/MCG-MAC entity, and the third point in time corresponds to the time when a new uplink transmission resource becomes available at the SCG/SCG-MAC entity.

At step 940, the UE triggers PHR at the fourth point in time at the corresponding CG/MAC entity and the other CG/MAC entity. In certain embodiments, the fourth point in time corresponds to a point in time after a preset time from completion of activation of all serving cells indicated by A/D MAC CE having caused a serving cell activation PHR triggering event, or corresponds to a point in time after a preset time from reception of A/D MAC CE having caused a serving cell activation PHR triggering event. For example, when A/D MAC CE is received via SCG serving cell, the UE triggers PHR for MCG at MCG-MAC and triggers PHR for SCG at SCG-MAC. If A/D MAC CE indicates activation of, for example, SCG serving cell 1 and serving cell 2, and when activation of serving cell 1 is completed at t1 and activation of serving cell 2 is completed at t2 after t1, both PHR for MCG-MAC and PHR for SCG-MAC are triggered with respect to t2 (last activation time). Or, when the A/D MAC CE is received at subframe n via MCG serving cell, the UE triggers PHR for MCG-MAC at subframe n+m and triggers PHR for SCG-MAC at a subframe overlapping with subframe n+m in the time domain.

Figure 10:
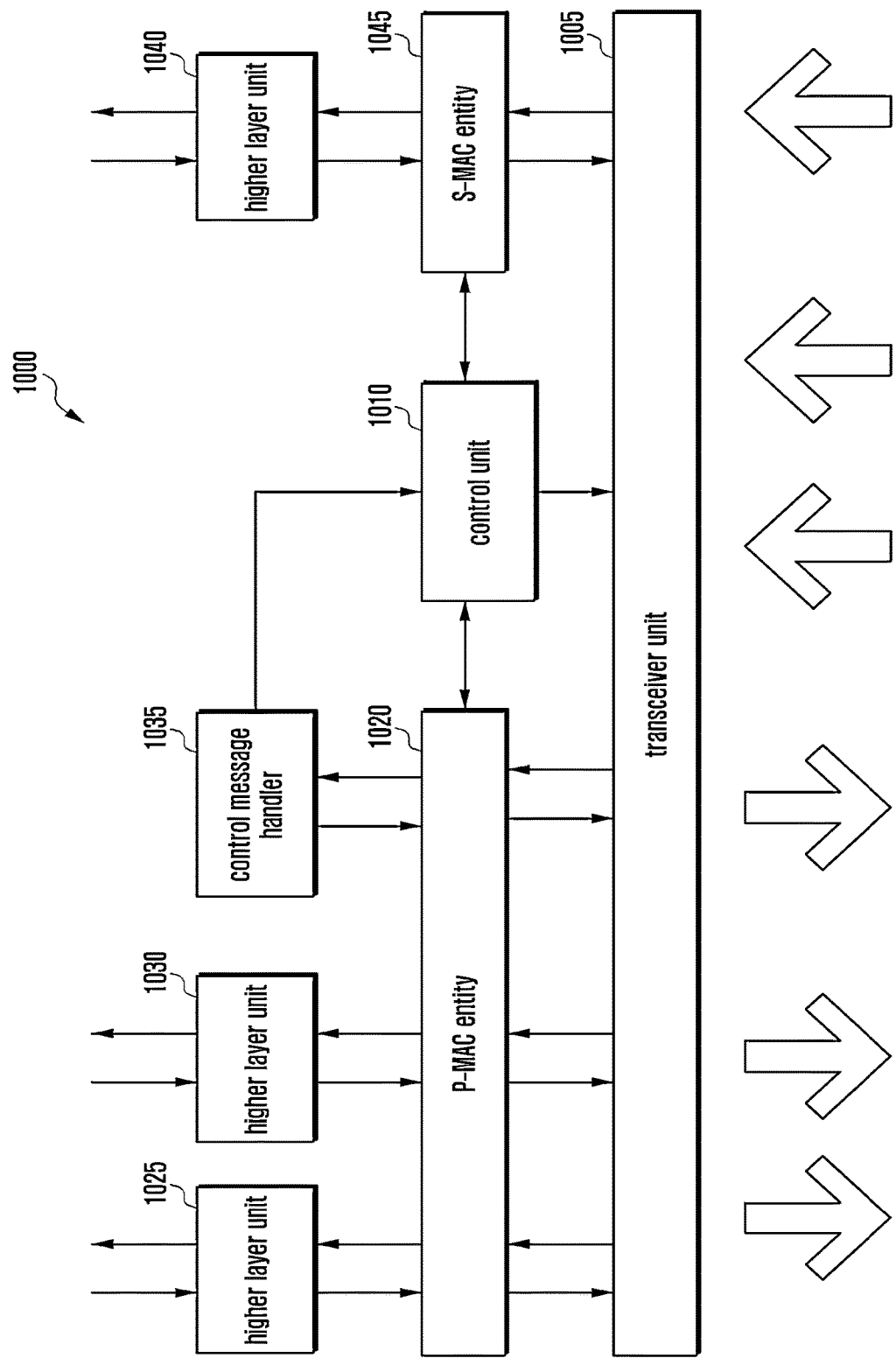
FIG. 10 is a block diagram of a user equipment according to various embodiments of the present disclosure.

FIG. 10 is a block diagram of a user equipment according to various embodiments of the present disclosure.

Referring to FIG. 10, the UE 1000 includes a P-MAC entity 1020, a control message handler 1035, various higher layer units 1025, 1030 and 1040, a control unit 1010, an S-MAC entity 1045, and a transceiver unit 1005.

The transceiver unit 1005 receives data and control signals through downlink channels of a serving cell and sends data and control signals through uplink channels. When multiple serving cells are configured, the transceiver unit 1005 sends and receives data and control signals through the multiple serving cells. The transceiver unit 1005 is connected with P-MAC, S-MAC and various transport channels.

The P-MAC entity 1020 and the S-MAC entity 1045 multiplex data coming from the higher layer units 1025, 1030 and 1040 or the control message handler 1035, and demultiplex data received by the transceiver unit 1005 and forward the demultiplexed data to the higher layer units 1025, 1030 and 1040 or the control message handler 1035.

In addition, the P-MAC entity 1020 and the S-MAC entity 1045 control BSR, PHR and DRX operations.

The control message handler 1035 acting as an RRC layer entity processes a control message received from a base station and performs a corresponding action. For example, the control message handler 1035 receives an RRC control message and forwards S-MAC configuration information to the control unit 1010.

The higher layer units 1025, 1030 and 1040 are configured on a service basis. The higher layer units 1025, 1030 and 1040 processes user data generated by service applications such as File Transfer Protocol (FTP) and Voice over Internet Protocol (VoIP) and forward the processed user data to the P-MAC or S-MAC, and process data coming from the P-MAC or S-MAC and forward the processed data to appropriate service applications at the higher layer.

The control unit 1010 examines scheduling commands such as UL grants received through the transceiver unit 1005, and controls the transceiver unit 1005 and the mux/demux unit 1015 so that uplink transmissions are performed at proper points in time with appropriate transmission resources. The control unit 1010 performs P-MAC reconfiguration and S-MAC configuration/release (or activation/deactivation), and controls mappings between P-MAC and logical channels, mappings between S-MAC and logical channels, mappings between P-MAC and DL/UL-SCH, and mappings between S-MAC and DL/UL-SCH.

Meanwhile, the UE 1000 is not limited to the configuration shown in FIG. 10. The configuration of the UE 1000 is simplified. For example, the UE 1000 is configured to include the transceiver unit 1005 and the control unit 1010. The transceiver unit 1005 sends and/or receives signals. The control unit 1010 controls the overall operation of the UE 1000. The control unit 1010 controls operations of the UE according to embodiments of the present disclosure described in connection with FIGS. 1 to 9.

Specifically, the control unit 1010 controls a process of receiving first PHR configuration information for a first ENB, receiving second PHR configuration information for a second ENB, generating, when the UE has dual connectivity to the first ENB and the second ENB, a dual connectivity PHR containing PHR information for the first ENB and second ENB on the basis of a dual connectivity PHR format, and sending the generated dual connectivity PHR.

In certain embodiments, the first ENB is a base station controlling the PCell (primary cell) of the UE, and the second ENB is a base station controlling a SCell (secondary cell) of the UE. The dual connectivity PHR format contain type 2 PH information of the PCell and type 2 PH information of the PSCell (primary SCell).

When simultaneous PUSCH (physical uplink shared channel)/PUCCH (physical uplink control channel) transmission information is configured for the first ENB, the control unit 1010 controls the dual connectivity PHR format to contain type 2 PH information of the PCell.

When simultaneous PUSCH/PUCCH transmission information is configured for the second ENB, the control unit 1010 controls the dual connectivity PHR format to contain type 2 PH information of the PSCell.

The dual connectivity PHR format contains type 2 PH information, and the type 2 PH information is determined in consideration of PUSCH transmission output power and PUCCH transmission output power of the corresponding cell.

When pathloss of at least one serving cell among serving cells of the first ENB or the second ENB is greater than or equal to a preset threshold, the control unit 1010 triggers transmission of the dual connectivity PHR.

Figure 11:
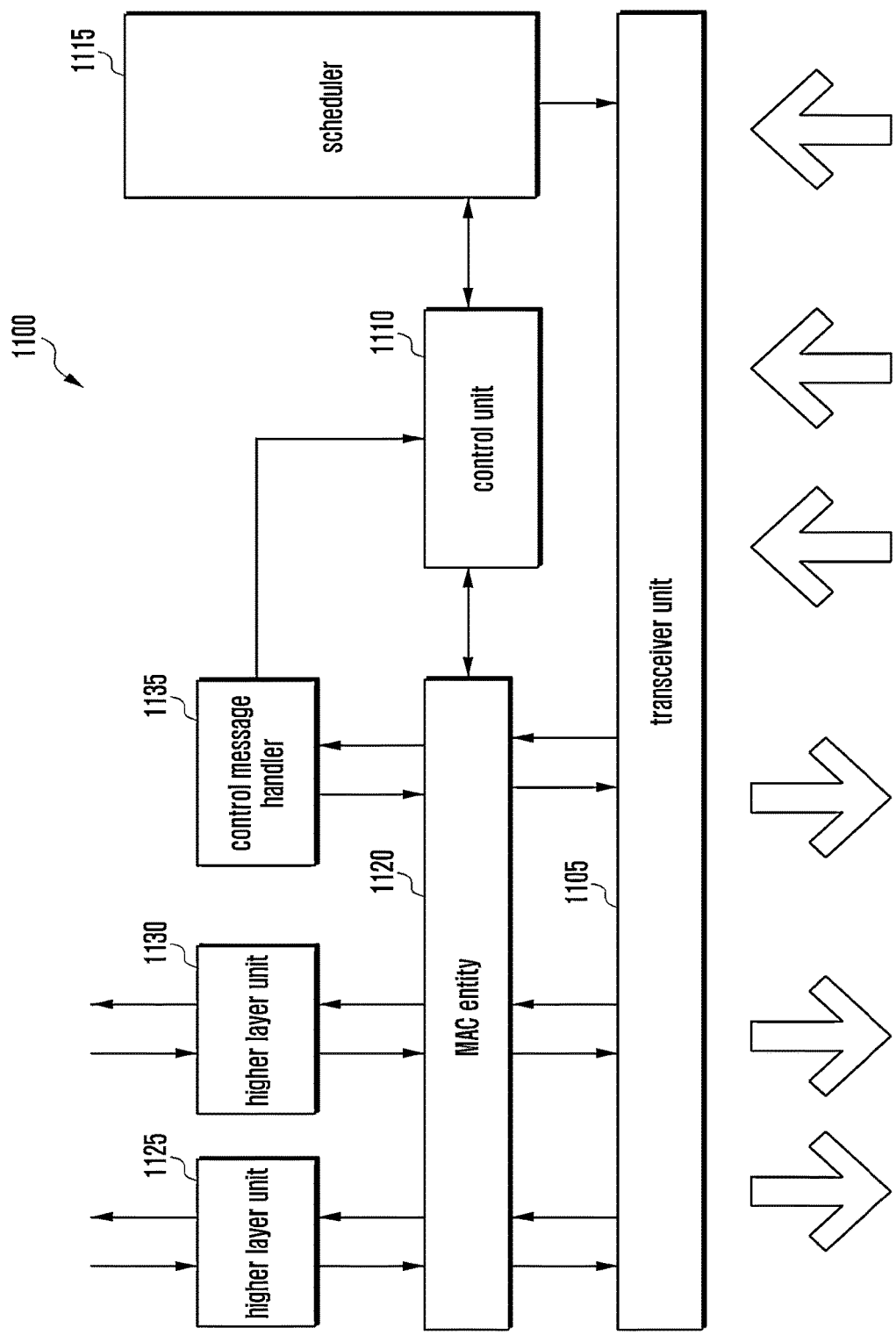
FIG. 11 is a block diagram of a base station according to various embodiments of the present disclosure.

FIG. 11 is a block diagram of a base station according to various embodiments of the present disclosure.

Referring to FIG. 11, the ENB 1100 includes a transceiver unit 1105, a control unit 1110, a MAC entity 1120, a control message handler 1135, various higher layer units 1125 and 1130, and a scheduler 1115.

The transceiver unit 1105 sends data and control signals through a downlink carrier and receives data and control signals through an uplink carrier. When multiple carriers are configured, the transceiver unit 1105 sends and receives data and control signals through the multiple carriers.

The MAC entity 1120 multiplexes data coming from the higher layer units 1125 and 1130 or the control message handler 1135, and demultiplexes data received by the transceiver unit 1105 and forwards the demultiplexed data to the higher layer units 1125 and 1130, the control message handler 1135 or the control unit 1110. The control message handler 1135 processes a control message received from a user equipment and performs a corresponding operation, and generates a control message to be sent to a user equipment and forwards the control message to a lower layer.

The scheduler 1115 allocates transmission resources to a user equipment at appropriate points in time in consideration of buffer states and channel states of the user equipment, and controls the transceiver unit 1105 to send or receive a signal to or from the user equipment.

The control unit 1110 controls operations of the ENB described in the present disclosure.

Meanwhile, the ENB 1100 is not limited to the configuration shown in FIG. 11. The configuration of the ENB 1100 is simplified. For example, the ENB 1100 is configured to include the transceiver unit 1105 and the control unit 1110. The transceiver unit 1105 sends and/or receives signals. The control unit 1110 controls the overall operation of the ENB 1100. The control unit 1110 controls operations of the ENB according to embodiments of the present disclosure described in connection with FIGS. 1 to 9.

The control unit 1110 controls a process of transmitting first PHR configuration information of a first ENB to a UE, transmitting second PHR configuration information of a second ENB to the UE, and receiving a PHR from the UE. When the UE has dual connectivity to the first ENB and the second ENB, the PHR is a dual connectivity PHR that contains PHR information for the first ENB and second ENB and is generated based on a dual connectivity PHR format.

In certain embodiments, the first ENB is a base station controlling the PCell (primary cell) of the UE, and the second ENB is a base station controlling a SCell (secondary cell) of the UE. The dual connectivity PHR format contain type 2 PH information of the PCell and type 2 PH information of the PSCell (primary SCell).

When simultaneous PUSCH (physical uplink shared channel)/PUCCH (physical uplink control channel) transmission information for the first ENB is configured in the UE, the dual connectivity PHR format contains type 2 PH information of the PCell.

When simultaneous PUSCH/PUCCH transmission information for the second ENB is configured in the UE, the dual connectivity PHR format contains type 2 PH information of the PSCell.

The dual connectivity PHR format contains type 2 PH information, and the type 2 PH information is determined in consideration of PUSCH transmission output power and PUCCH transmission output power of the corresponding cell.

When pathloss of at least one serving cell among serving cells of the first ENB or the second ENB is greater than or equal to a preset threshold, transmission of a dual connectivity PHR is triggered.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method performed by a user equipment (UE) in a mobile communication system, the method comprising:
receiving power headroom report (PHR) configuration information for multiple cells, wherein a first medium access control (MAC) entity for a first cell group and a second MAC entity for a second cell group are configured to the UE, wherein the first cell group is different than the second cell group; and
in response to determining that a prohibit PHR timer expires and after identifying that a pathloss of at least one activated serving cell of any of the first MAC entity for the first cell group or the second MAC entity for the second cell group has changed more than a threshold:
generating, at the first MAC entity for the first cell group in a first timing, a first PHR for the multiple cells containing PHR information for the first cell group and a second cell group based on the PHR configuration information for the multiple cells, and
generating, at the second MAC entity for the second cell group in a second timing, a second PHR for the multiple cells containing PHR information for the first cell group and the second cell group based on the PHR configuration information for the multiple cells,
wherein the first timing is determined in case that the first MAC entity for the first cell group has a resource for new uplink transmission, and
wherein the second timing is determined in case that the second MAC entity for the second cell group has a resource for new uplink transmission.

2. The method of claim 1, wherein the first cell group is related to a base station controlling a primary cell (PCell) of the UE, and the second cell group distinct from the first cell group is related to a base station controlling a secondary cell (SCell) of the UE.

3. The method of claim 1, wherein the first cell group corresponds to a master cell group (MCG) and the second cell group corresponds to a secondary cell group (SCG).

4. The method of claim 1, wherein the first PHR for the multiple cells contains type 2 PH information, and
wherein the type 2 PH information is determined based on a physical uplink shared channel (PUSCH) transmission output power and a physical uplink control channel (PUCCH) transmission output power of a corresponding cell.

5. A method performed by a base station in a mobile communication system, the method comprising:
transmitting power headroom report (PHR) configuration information for multiple cells to a user equipment (UE), wherein a first medium access control (MAC) entity for a first cell group and a second MAC entity for a second cell group are configured to the UE, wherein the first cell group is different than the second cell group; and
receiving a first PHR and a second PHR for the multiple cells from the UE, wherein each of the first PHR and the second PHR for the multiple cells contains PHR information for the first cell group and the second cell group, and wherein, after a prohibit PHR timer expires and a pathloss of at least one activated serving cell of any of the first MAC entity for the first cell group or the second MAC entity for the second cell group is identified as having changed more than a threshold, the first PHR for the multiple cells is generated at the first MAC entity for the first cell group in a first timing and the second PHR for the multiple cells is generated at the second MAC entity for the second cell group in a second timing, based on the PHR configuration information for the multiple cells, wherein the first timing is determined in case that the first MAC entity for the first cell group has a resource for new uplink transmission, and wherein the second timing is determined in case that the second MAC entity for the second cell group has a resource for new uplink transmission.

6. The method of claim 5, wherein the first cell group is related to a base station controlling a primary cell (PCell) of the UE, and the second cell group distinct from the first cell group is related to a base station controlling a secondary cell (SCell) of the UE.

7. The method of claim 5, wherein the first cell group corresponds to a master cell group (MCG) and the second cell group corresponds to a secondary cell group (SCG).

8. The method of claim 5, wherein the first PHR for the multiple cells contains type 2 PH information, and wherein the type 2 PH information is determined based on a physical uplink shared channel (PUSCH) transmission output power and a physical uplink control channel (PUCCH) transmission output power of a corresponding cell.

9. A user equipment (UE) in a mobile communication system, the UE comprising:
a transceiver; and
a controller configured to:
receive, via the transceiver, power headroom report (PHR) configuration information for multiple cells, wherein a first medium access control (MAC) entity for a first cell group and a second MAC entity for a second cell group are configured to the UE, wherein the first cell group is different than the second cell group, and
in case that a prohibit PHR timer expires and after identifying that a pathloss of at least one activated serving cell of any of the first MAC entity for the first cell group or the second MAC entity for the second cell group has changed more than a threshold:
generate, at the first MAC entity for the first cell group in a first timing, a first PHR for the multiple cells containing PHR information for the first cell group and a second cell group based on the PHR configuration information for the multiple cells, and
generate, at the second MAC entity for the second cell group in a second timing, a second PHR for the multiple cells containing PHR information for the first cell group and the second cell group based on the PHR configuration information for the multiple cells,
wherein the first timing is determined in case that the first MAC entity for the first cell group has a resource for new uplink transmission, and wherein the second timing is determined in case that the second MAC entity for the second cell group has a resource for new uplink transmission.

10. The UE of claim 9, wherein the first cell group is related to a base station controlling a primary cell (PCell) of the UE, and the second cell group distinct from the first cell group is related to a base station controlling a secondary cell (SCell) of the UE.

11. The UE of claim 9, wherein the first cell group corresponds to a master cell group (MCG) and the second cell group corresponds to a secondary cell group (SCG).

12. The UE of claim 9, wherein the first PHR for the multiple cells contains type 2 PH information, and wherein the type 2 PH information is determined based on a physical uplink shared channel (PUSCH) transmission output power and a physical uplink control channel (PUCCH) transmission output power of a corresponding cell.

13. A base station in a mobile communication system, the base station comprising:
a transceiver; and
a controller configured to:
transmit, via the transceiver, power headroom report (PHR) configuration information for multiple cells to a user equipment (UE), wherein a first medium access control (MAC) entity for a first cell group and a second MAC entity for a second cell group are configured to the UE, wherein the first cell group is different than the second cell group, and
receive, via the transceiver, a first PHR and a second PHR for the multiple cells from the UE,
wherein each of the first PHR and the second PHR for the multiple cells contains PHR information for the first cell group and the second cell group, and
wherein, in case that a prohibit PHR timer expires and after identifying that a pathloss of at least one activated serving cell of any of the first MAC entity for the first cell group or the second MAC entity for the second cell group has changed more than a threshold, the first PHR for the multiple cells is generated at the first MAC entity for the first cell group in a first timing and the second PHR for the multiple cells is generated at the second MAC entity for the second cell group in a second timing, based on the PHR configuration information for the multiple cells,
wherein the first timing is determined in case that the first MAC entity for the first cell group has a resource for new uplink transmission, and
wherein the second timing is determined in case that the second MAC entity for the second cell group has a resource for new uplink transmission.

14. The base station of claim 13, wherein the first cell group is related to a base station controlling a primary cell (PCell) of the UE, and the second cell group distinct from the first cell group is related to a base station controlling a secondary cell (SCell) of the UE.

15. The base station of claim 13, wherein the first cell group corresponds to a master cell group (MCG) and the second cell group corresponds to a secondary cell group (SCG).

16. The base station of claim 13, wherein the first PHR for the multiple cells contains type 2 PH information, and
wherein the type 2 PH information is determined based on a physical uplink shared channel (PUSCH) transmission output power and a physical uplink control channel (PUCCH) transmission output power of a corresponding cell.

* * * * *